US012747555B2

(12) United States Patent
Friedman et al.

(10) Patent No.: US 12,747,555 B2
(45) Date of Patent: Sep. 29, 2026

(54) WAVE MITIGATION STRUCTURE AND PROCESS OF MANUFACTURING

(71) Applicant: 1Print LLC, Wilmington, DE (US)

(72) Inventors: Adam C. Friedman, Buffalo, NY (US); Fredrik Wannius, Wellington, FL (US)

(73) Assignee: 1PRINT LLC, Wellington, FL (US)

( * ) Notice: Subject to any disclaimer, the term of this patent is extended or adjusted under 35 U.S.C. 154(b) by 86 days.

(21) Appl. No.: 18/732,119

(22) Filed: Jun. 3, 2024

(65) Prior Publication Data

US 2024/0401292 A1 Dec. 5, 2024

Related U.S. Application Data

(60) Provisional application No. 63/505,901, filed on Jun. 2, 2023.

(51) Int. Cl.
*E02B 3/06* (2006.01)
*B33Y 80/00* (2015.01)

(52) U.S. Cl.
CPC ................. *E02B 3/06* (2013.01); *B33Y 80/00* (2014.12)

(58) Field of Classification Search
CPC ... E02B 3/04; E02B 3/046; E02B 3/06; E02B 3/129; E02B 3/14
See application file for complete search history.

(56) References Cited

U.S. PATENT DOCUMENTS 2,474,786 A * 6/1949 Humphrey ................ E02B 3/06 256/12.5
3,096,621 A 7/1963 Danel
3,490,239 A * 1/1970 Georges .................... E02B 3/06 405/31
4,172,680 A 10/1979 Neil
4,175,888 A * 11/1979 Ijima ......................... E02B 3/06 405/33
4,439,059 A 3/1984 Kikuzawa et al.
(Continued)

FOREIGN PATENT DOCUMENTS

AU 2020364137 A1 * 4/2022 ............. E02B 3/046
CN 111418395 A * 7/2020 ........... A01G 25/023
(Continued)

OTHER PUBLICATIONS

U.S. Pat. No. 0,954,283 A, Hawkes Frederick W, Apr. 5, 1910.
1Print_Miami SeaHive_VF_1, Half solid unit.
1Print_Miami SeaHive_VF_2; General design.

*Primary Examiner* — Benjamin F Fiorello
(74) *Attorney, Agent, or Firm* — Simpson & Simpson, PLLC; Kevin M. Bronson

(57) ABSTRACT

A wave-force mitigation structure, comprising at least one cluster section having at least one longitudinal passageway, the longitudinal passageway having at least one center point, the at least one center point defined by one of: an imaginary circumference; and, an internal edge of the at least one longitudinal passageway, the cluster section having a longitudinal opening in fluid communication with at least one adjacent passageway, and at least one reinforcement structure embedded within the at least cluster section and arranged proximate the internal edge of the at least one longitudinal passageway, wherein the cluster section is formed by the process of 3D printing.

14 Claims, 20 Drawing Sheets

(56) References Cited

U.S. PATENT DOCUMENTS

| | | | | | |
|---|---|---|---|---|---|
| 4,479,740 | A * | 10/1984 | Schaaf | E02B 3/04 405/33 |
| D302,313 | S | 7/1989 | Lenson | |
| 4,877,349 | A * | 10/1989 | Greene | E02B 3/06 405/27 |
| 5,655,851 | A * | 8/1997 | Chor | E02B 3/06 405/15 |
| 5,988,942 | A | 11/1999 | Atkinson | |
| 6,896,445 | B1 * | 5/2005 | Engler | A01K 61/70 D25/115 |
| 7,029,200 | B1 | 4/2006 | Cravens | |
| 7,762,205 | B1 | 7/2010 | Veazey | |
| 9,279,223 | B2 | 3/2016 | Messina | |
| 9,915,047 | B2 | 3/2018 | Burt | |
| 11,028,548 | B2 * | 6/2021 | Chapron | E02B 3/06 |
| 11,072,900 | B2 * | 7/2021 | Kettavong | E02B 3/06 |
| 11,255,061 | B1 * | 2/2022 | Lopez | E02B 3/06 |
| 2003/0091391 | A1 * | 5/2003 | Veazey | E02D 27/06 405/23 |
| 2010/0310313 | A1 | 12/2010 | Kohlenberg | |
| 2012/0051845 | A1 * | 3/2012 | Alkon | E02B 3/20 405/218 |
| 2013/0004239 | A1 | 1/2013 | Roberts | |
| 2016/0312427 | A1 * | 10/2016 | De Groot | E02B 3/04 |
| 2019/0127976 | A1 * | 5/2019 | Donnelly | A63H 33/107 |
| 2022/0396925 | A1 * | 12/2022 | Ascencio Ascencio | E02B 3/046 |
| 2023/0039419 | A1 | 2/2023 | Pons | |

FOREIGN PATENT DOCUMENTS

| | | | | |
|---|---|---|---|---|
| CN | 112921889 | A * | 6/2021 | E01F 7/02 |
| FR | 2579643 | A1 | 10/1986 | |
| JP | H0779661 | A | 3/1995 | |
| KR | 100374186 | B1 | 3/2003 | |
| KR | 200350402 | Y1 | 5/2004 | |
| KR | 100985893 | B1 | 10/2010 | |
| KR | 20170057059 | A * | 5/2017 | A01K 61/70 |
| KR | 101828285 | B1 * | 2/2018 | B28B 1/001 |
| KR | 20200100991 | A * | 8/2020 | E02B 3/14 |
| WO | 2011016068 | A1 | 2/2011 | |

* cited by examiner

WAVE MITIGATION STRUCTURE AND PROCESS OF MANUFACTURING

CROSS-REFERENCE TO RELATED APPLICATIONS

This application claims priority pursuant to 35 U.S.C. 119 (a) to U.S. Provisional Application No. 63/505,901, filed Jun. 2, 2023, and pursuant to 35 U.S.C. 120 U.S. Design application Ser. No. 29/919,935, filed Dec. 7, 2023, and U.S. Design application Ser. No. 29/945,159, filed May 31, 2024, which applications are incorporated herein by reference in their entireties.

FIELD

The present invention relates to a wave mitigation structure, specifically a wave mitigation structure produced via additive manufacturing.

BACKGROUND

Generally, three-dimensional ("3D") printing is a process that extrudes material layer by layer, forming an article of manufacture from the completed extrusion layers, also known as additive manufacturing. This process is used to manufacture smaller items, such as prototypes to full scale structures. The extrusion of material from the 3D printer must have a stable surface in order for the bead to accurately and precisely match a particular model. The model refers to a digital model, such a CAD model, which a 3D printer will use to guide the extrusion layers to create the particular configuration of each required layer, eventually "printing" the entire component or components.

Many known articles of manufacture are created via precast techniques, with concrete or stone. Precast articles are construction products produced by casting concrete in a reusable mold, or "form", which is then cured in a controlled environment, transported to the construction site and maneuvered into place; examples include precast beams, and wall panels for tilt up construction. Alternatively, cast-in-place concrete is poured into site-specific forms and cured on site.

Wave mitigation structures can come in a variety of forms such as breakwaters, seawalls, coastal dikes, buffer blocks, and recurved seawalls. Generally, these are physical structures that are positioned in locations, allowing the particular structure to physically brace against oncoming waves. These structures can be placed underwater, at sea level, or a combination thereof. It is common for these structures to be constructed via precast techniques.

Precast manufacturing techniques however can introduce a variety of issues with the finished articles, including, but not limited to: failure in sealing joints (e.g., joints can separate from one another which can compromise and weaken the structure); potential shipping issues (e.g., weight, size, and damage-avoidance precautions); offloading and rigging concerns (e.g., the need for large commercial-scale cranes); lack of flexibility (e.g., precast articles are built to drawing specifications that may not meet the dimensions of the installation, therefore making the article useless); and, repairing spalls, or cracks (e.g., spalls can occur from poor form construction, rough removal from forms, improper storage, early removal of the structure, and poor handling methods of the structure). Typically, wave-force mitigation structures are constructed via precast manufacturing techniques and can experience any of the aforementioned issues. Thus, there is a long felt need for an improved wave-mitigation structure.

Further background information is presented in the Appendix of U.S. Patent Application No. 63/505,901.

SUMMARY

Disclosed is an inventive concept for wave mitigation structures that is constructed via additive manufacturing; printed on site; and does not require a form.

The wave-mitigation structure can encompass a variety of sub-structures that are integrally formed as a singular structure.

One embodiment of the wave-mitigation structure is formed by the process of 3D printing and includes a plurality of apertures and/or at least one passageway in communication with at least some of the plurality of apertures, wherein at least one of the plurality of apertures and/or at least one passageway is arranged to accept water flow, current, waves, etc., therein and dissipate the water pressure and/or force by redirecting the water through the at least one of the plurality of apertures and/or at least one passageway. Apertures may also be termed perforations. In other embodiments, longitudinal openings are disposed between adjacent longitudinal passageways, putting them in fluid communication with each other—the longitudinal passageways which may be reinforced by solid portions within the longitudinal openings and physically connecting adjacent longitudinal passageways. These embodiments are designed so that longitudinal pathways can be 3D printed wherein printing can be contiguous or nearly so without needing to lift associated print heads.

The present invention generally comprises the wave-force mitigation structure, comprising at least one cluster section having at least one longitudinal passageway, the longitudinal passageway having at least one center point, the at least one center point defined by one of: an imaginary circumference; and, an internal edge of the at least one longitudinal passageway, the cluster section having a plurality of apertures in fluid communication with the at least one passageway or longitudinal openings disposed between adjacent longitudinal passageways. At least one reinforcement structure may be embedded within the at least one cluster section and arranged proximate to the internal edge of the at least one longitudinal passageway, wherein the cluster section is formed by the process of 3D printing.

In some embodiments, the present invention may comprise the wave-force mitigation structure having the at least one cluster section having the at least one longitudinal passageway, the longitudinal passageway having at least one center point, the at least one center point defined by one of: the imaginary circumference; and, the internal edge of the at least one longitudinal passageway, the cluster section having the plurality of apertures in fluid communication with the at least one passageway or longitudinal openings disposed between adjacent longitudinal passageways. The at least one reinforcement structure may be embedded within the at least one cluster section and arranged proximate the internal edge of the at least one longitudinal passageway.

In other embodiments, the present invention may generally comprise the wave-force mitigation structure, including the at least one cluster section having the at least one external body and the at least one internal body arranged with the external body, each of the at least one external body and the at least one internal body having the plurality of apertures arranged therein or longitudinal openings disposed between adjacent longitudinal passageways, and the at least one longitudinal passageway arranged within the at least one internal body, the longitudinal passageway having the at least one center point, the at least one center point defined by one of: the imaginary circumference; and, the internal edge of the at least one longitudinal passageway, wherein at least some of the plurality of apertures are in communication with the at least one passageway or longitudinal openings are disposed between adjacent longitudinal passageways.

In other embodiments, the present invention may have alternative design configurations substantially similar to those disclosed in at least one of U.S. Design Pat. Nos. 29/919,935, 29/919,935, and a combination thereof. (See FIGS. 14-17).

These and other objects, features, and advantages of the present invention will become readily apparent upon a review of the following detailed description, in view of the drawings and appended claims.

BRIEF DESCRIPTION OF THE DRAWINGS

Various embodiments are disclosed, by way of example only, with reference to the accompanying schematic drawings, in which corresponding reference symbols indicate corresponding parts, in which.

DETAILED DESCRIPTION

Figure 1:
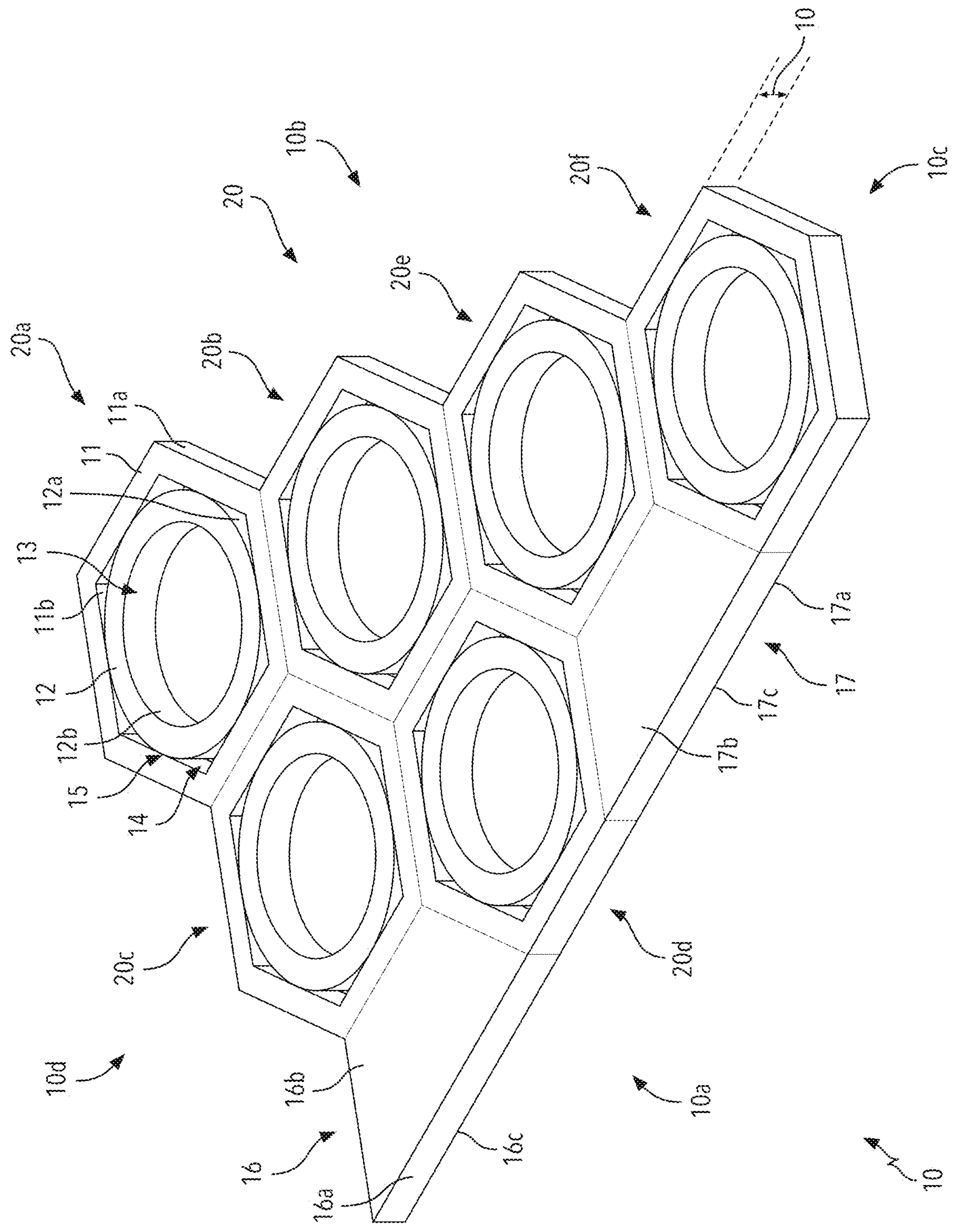
FIG. 1 is a perspective view of an outer layer of a sea-hive cluster of the present invention.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. As such, those in the art will understand that in any suitable material, now known or hereafter developed, may be used in forming the present invention described herein.

It should be noted that the terms "including", "includes", "having", "has", "containing", and "contains", are to be interpreted as substantially synonymous with the terms "comprising" and/or "comprises".

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

Figure 2:
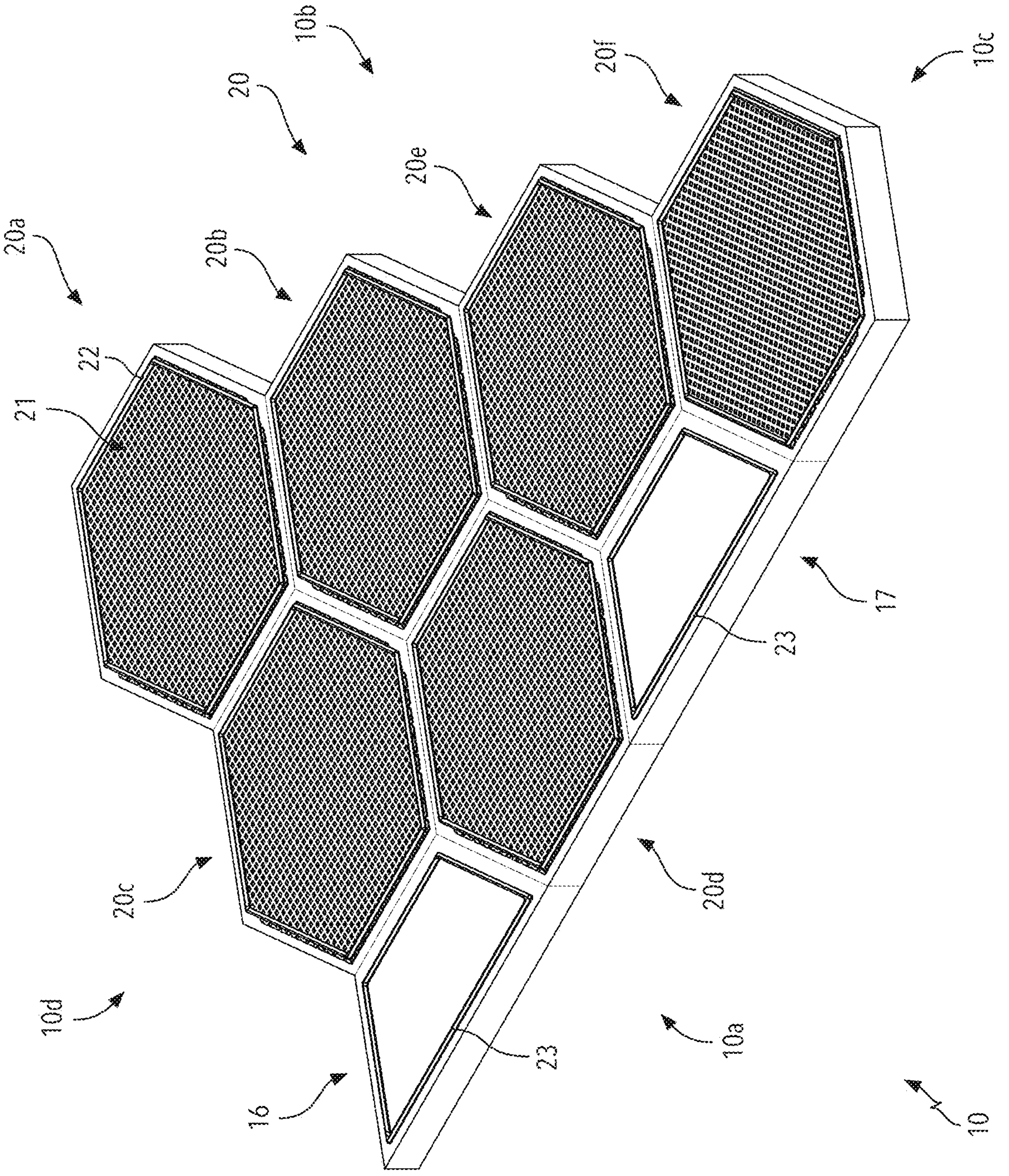
FIG. 2 is a perspective view of the outer layer shown in FIG. 1.
Figure 3:
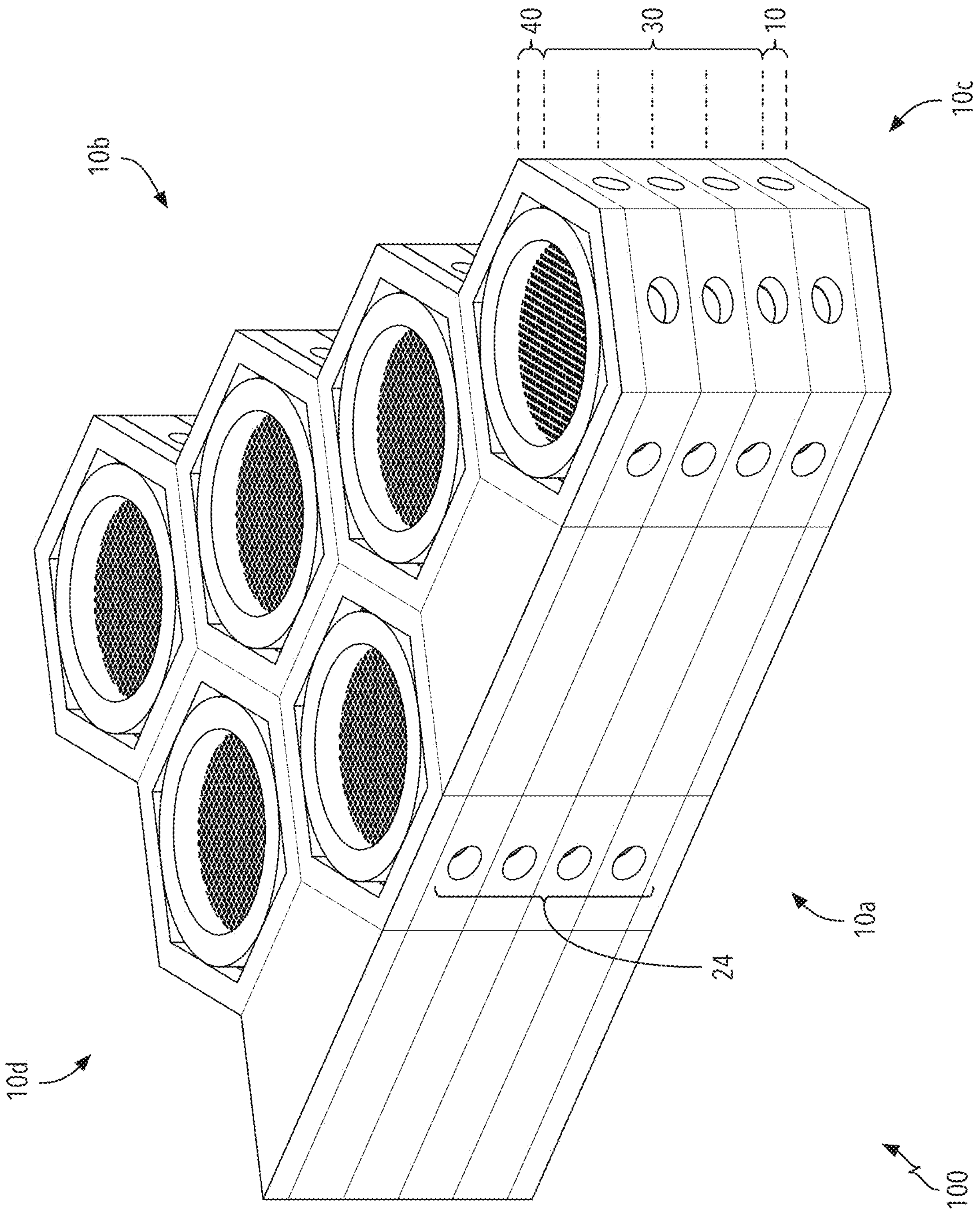
FIG. 3 is a perspective view of the outer layer shown in FIG. 1, a plurality of inner layers, and a second outer layer.
Figure 4:
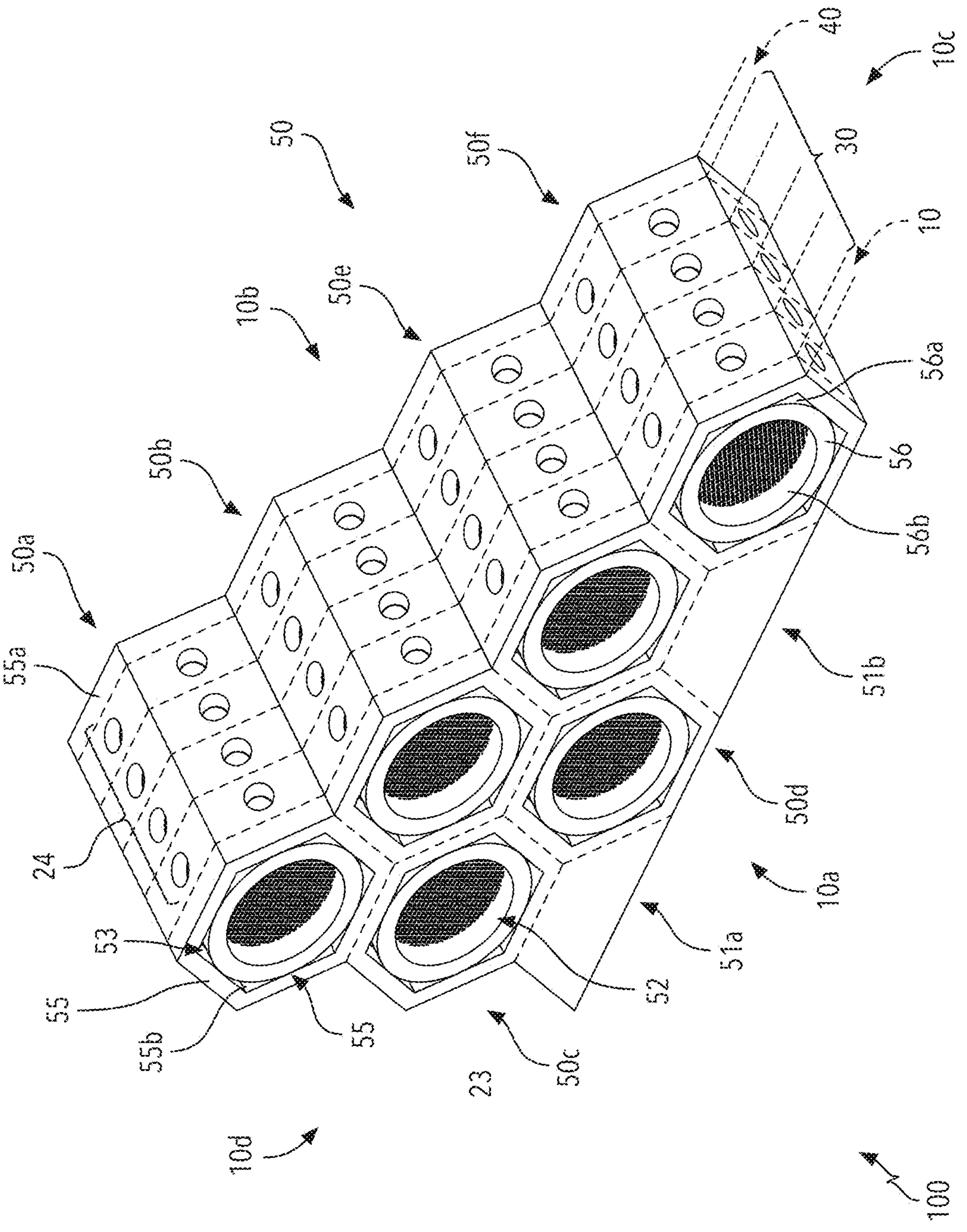
FIG. 4 is an upright perspective view of the fully-printed present invention.
Figure 5:
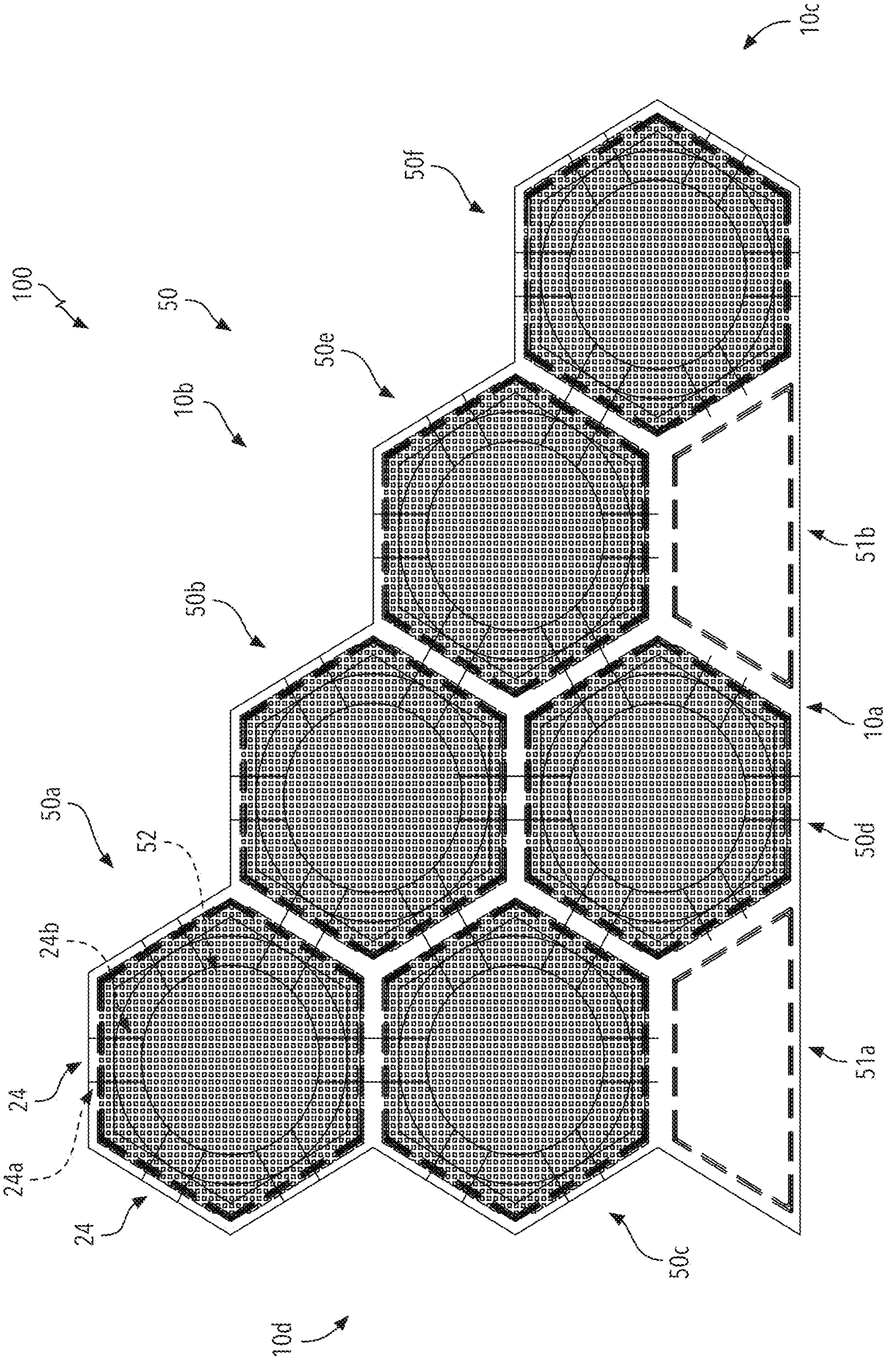
FIG. 5 is a front skeleton perspective view of the invention shown in FIG. 4.
Figure 6:
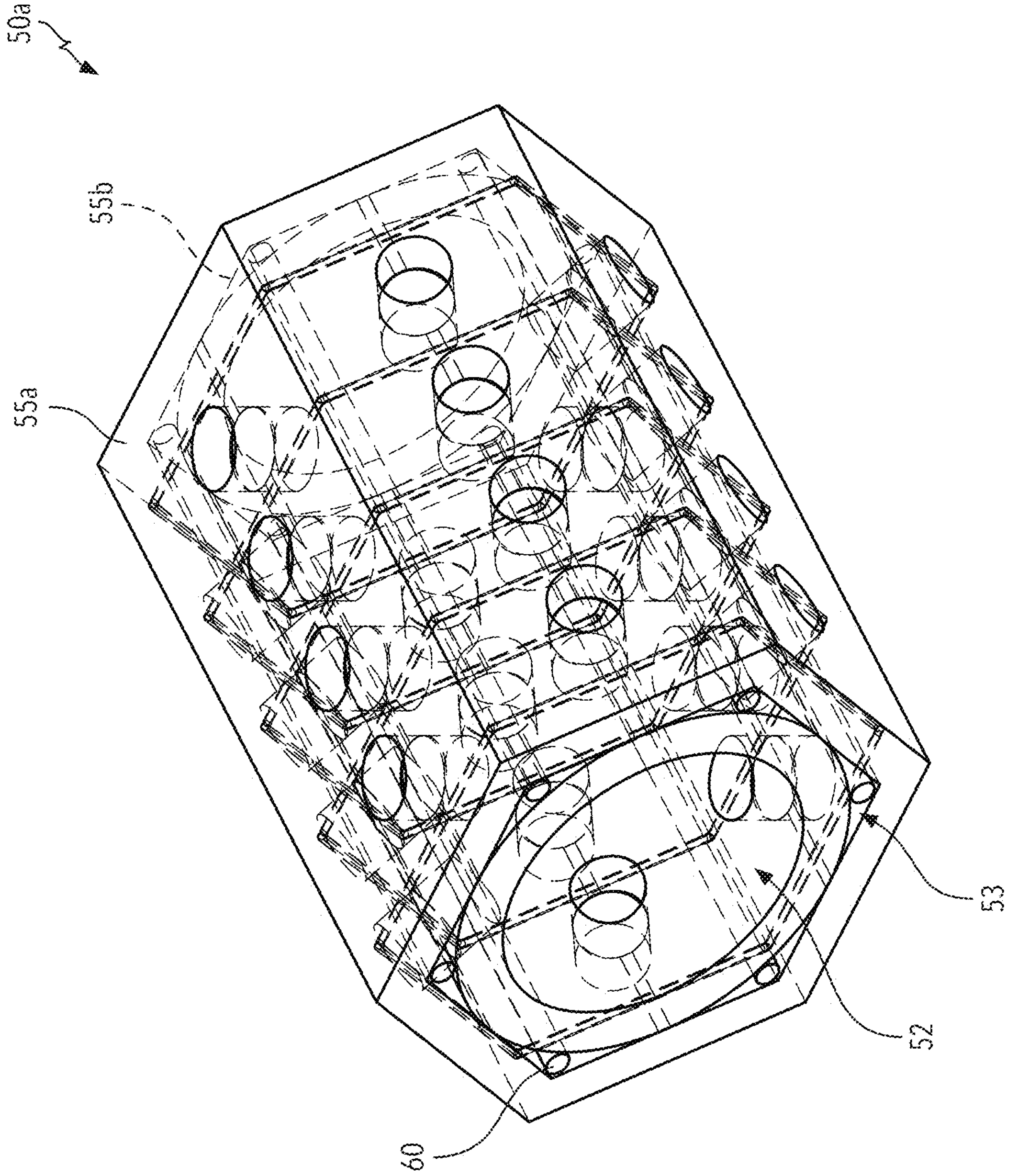
FIG. 6 illustrates a skeleton perspective view of a substructure of the invention shown in FIG. 4.
Figure 7:
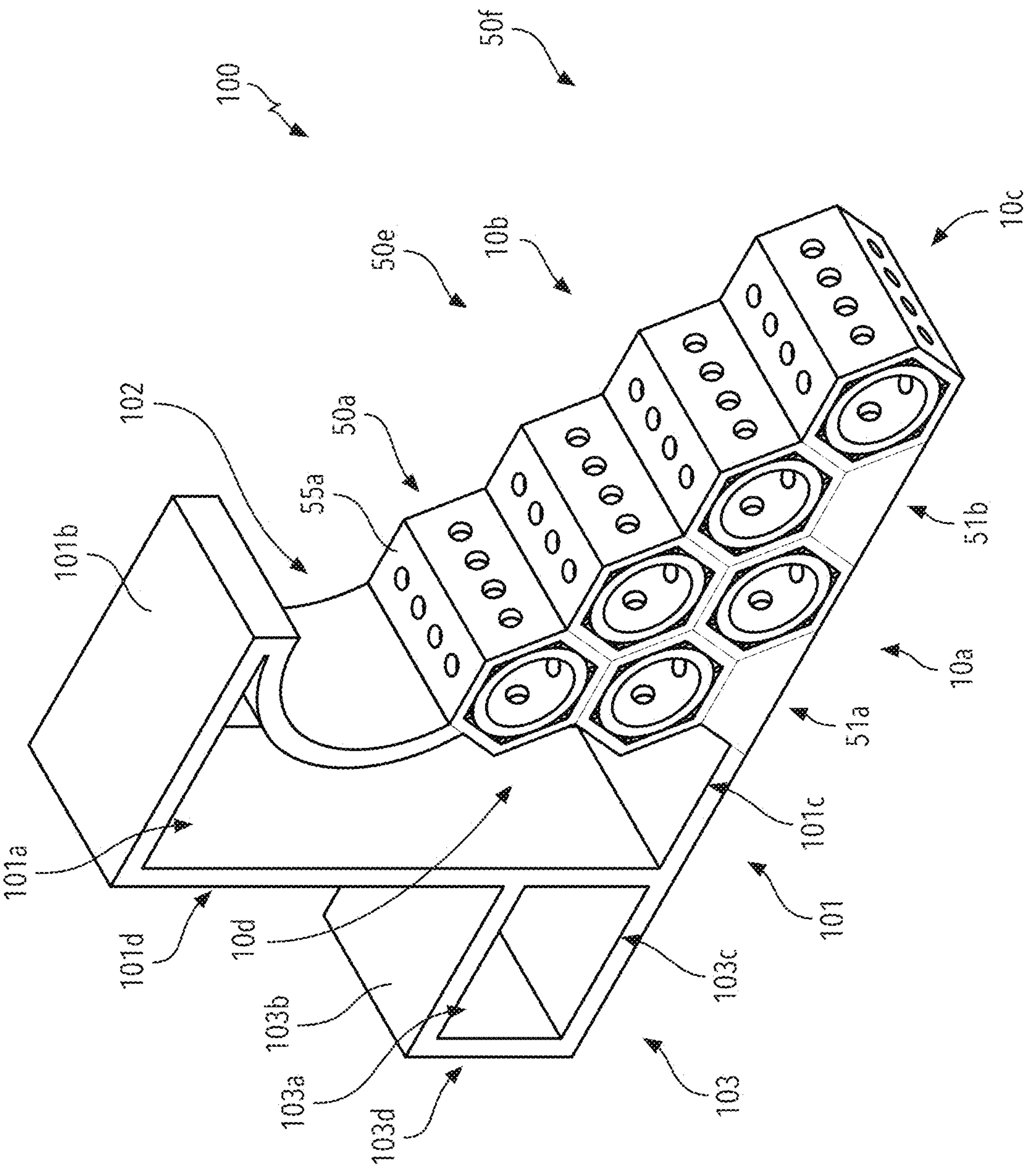
FIG. 7 illustrates an alternative embodiment of the invention shown in FIG. 4.
Figure 8:
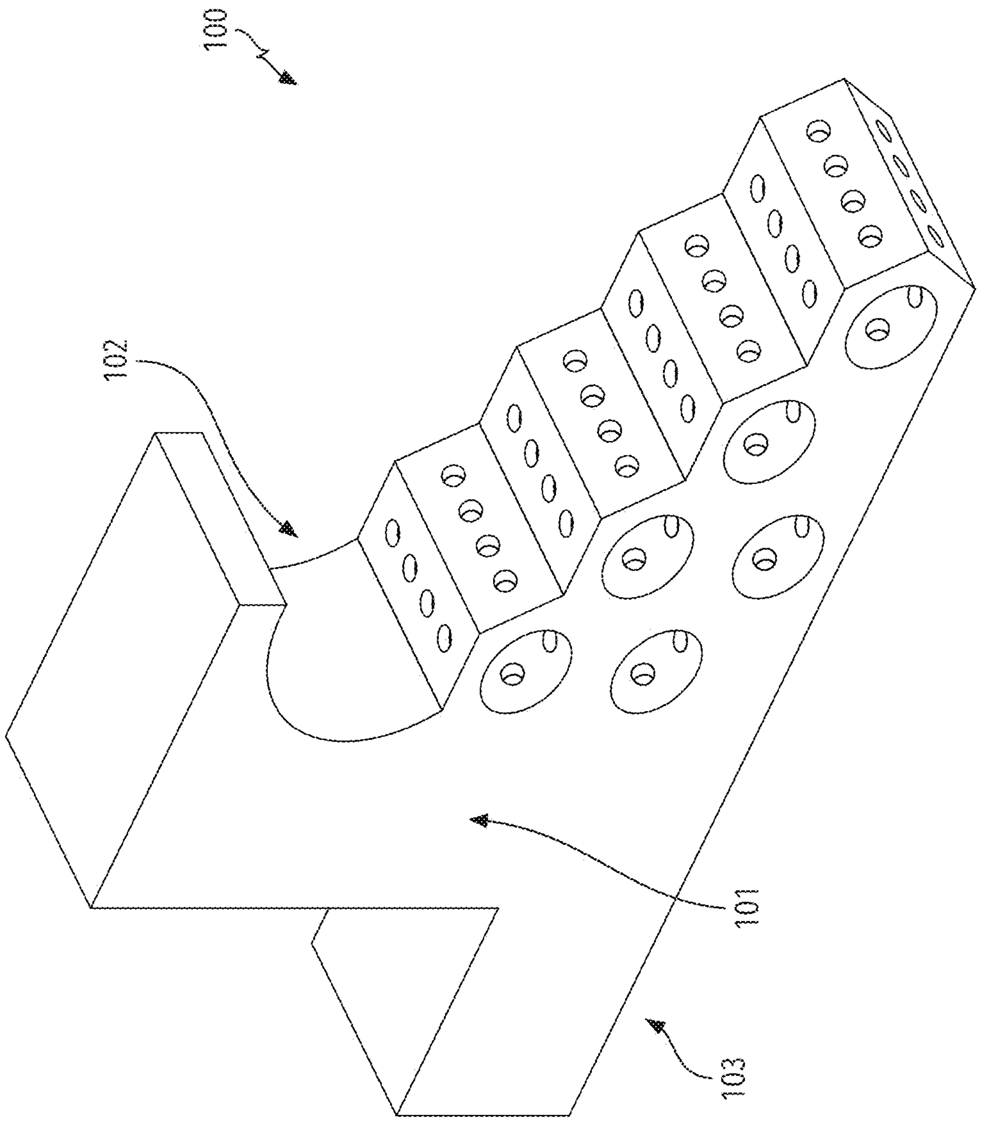
FIG. 8 is a perspective view of the invention shown in FIG. 7.
Figure 9B:
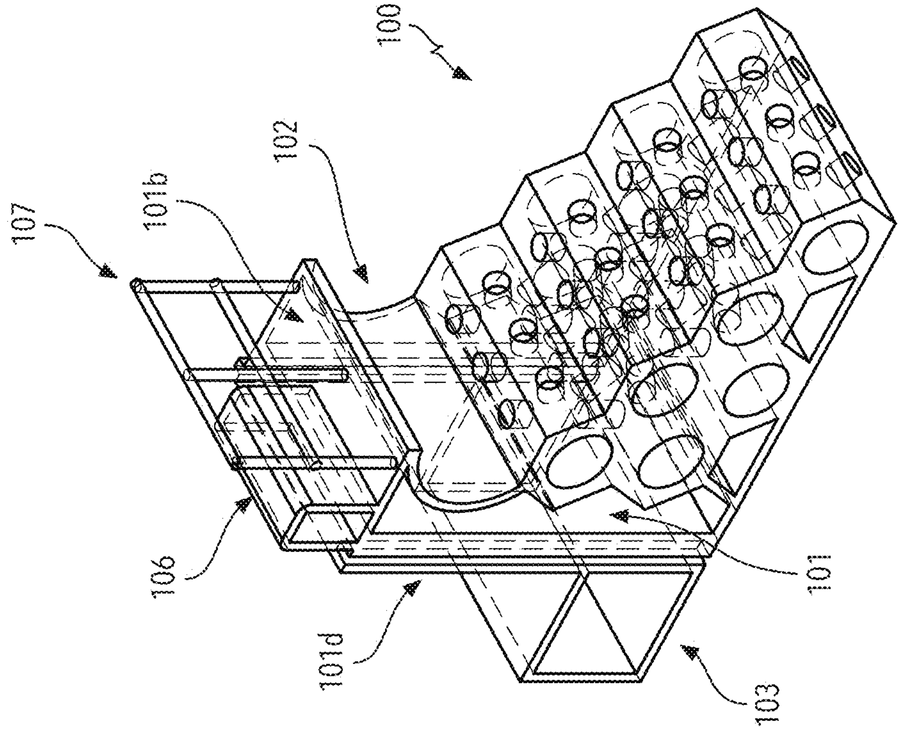
FIGS. 9A through 9D illustrate another alternative embodiment of the invention shown in FIG. 4.
Figure 9A:
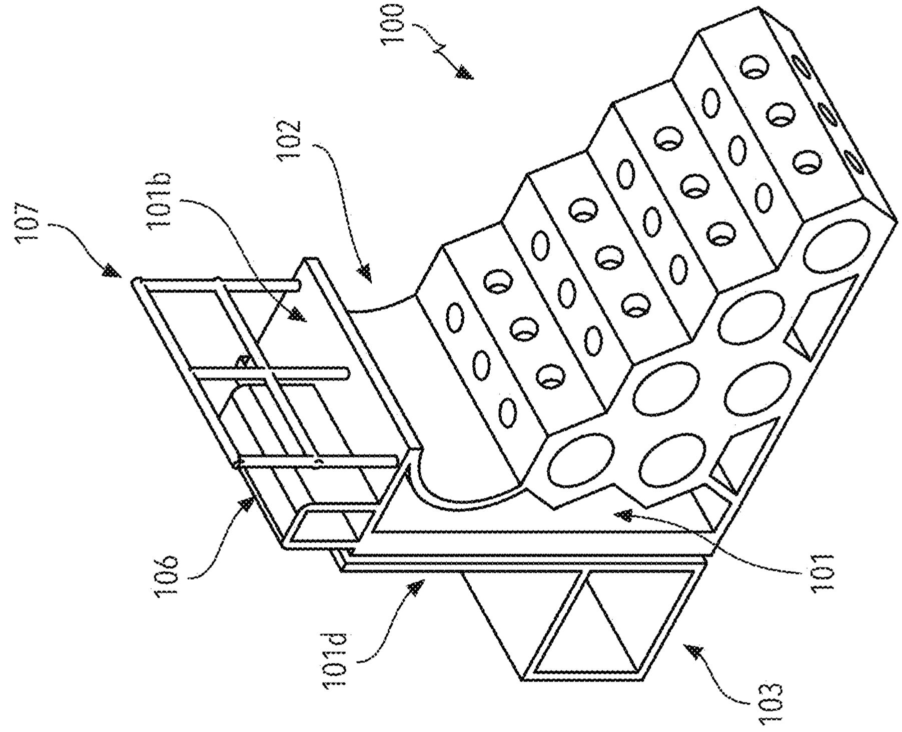
Figure 9D:
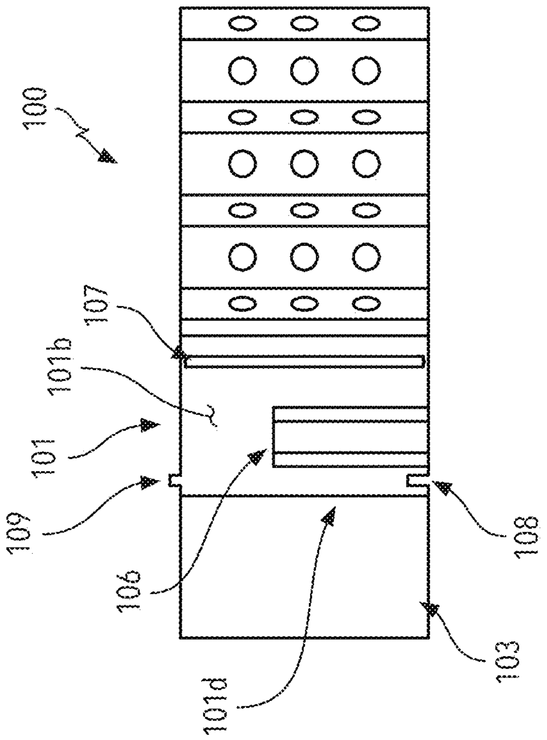
Figure 9C:
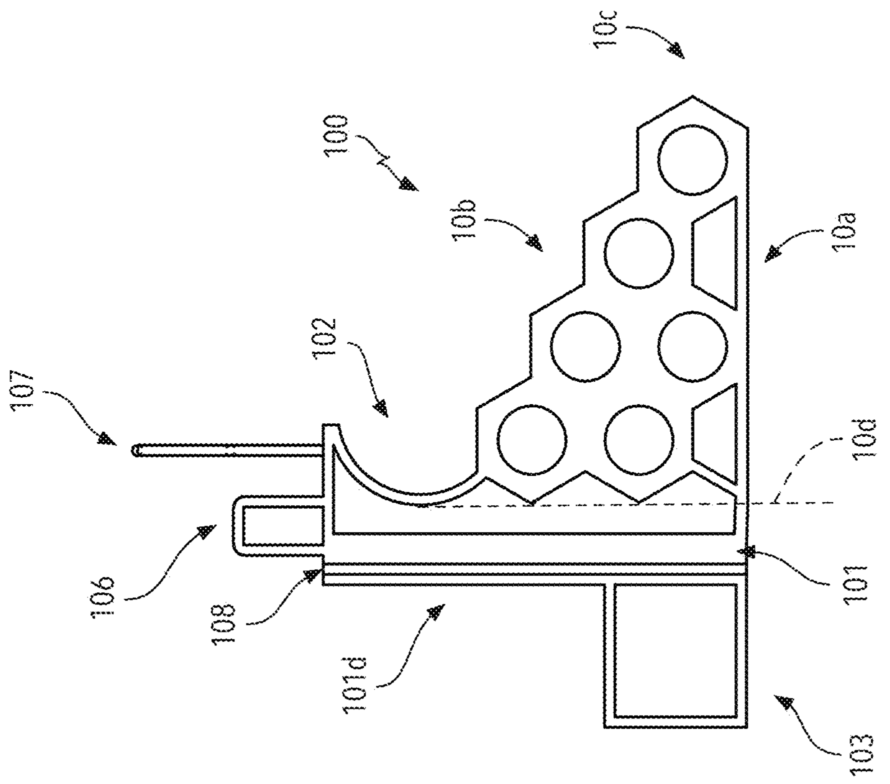

The following description should be taken in view of FIGS. 1 through 9. FIGS. 3 through 5 illustrate an embodiment of the present invention fully-assembled, mitigation structure 100. FIGS. 1 through 3 generally illustrate "layers" printed by a machine known in the art of additive manufacturing, which layers will comprise mitigation structure 100. FIG. 6 illustrates a perspective view of sub-structure 50*a* of mitigation structure 100. FIGS. 7 and 8 both illustrate an alternative embodiment of mitigation structure 100.

As shown in FIG. 3, mitigation structure 100 comprises at least three layers including a first outer layer, an inner layer, and a second outer layer. In some embodiments, mitigation structure 100 comprises first outer layer 10, at least one inner layer 30, and second outer layer 40. Mitigation structure 100 also includes distal end 10*a*, proximal end 10*b*, front end 10*c*, and back end 10*d*. FIG. 3 illustrates mitigation structure 100 having four (4) inner layers.

As shown in FIG. 1, first outer layer 10 is the first layer of mitigation structure 100 that is printed by the machine. First outer layer 10 generally includes cluster layer 20 which may comprised of a plurality of sub-structure portions 20*a*-20*f*, and base sections 16 and 17. Each of sub-structure portions 20*a*-20*f* includes external body 11 and internal body 12. External body 11 includes external surface 11*a* and internal surface 11*b*. Internal surface 11*b* defines space 14 therein. Internal body 12 has external surface 12*a* and internal surface 12*b* and is arranged within space 14 of external body 11. Internal surface 12*b* of internal body 12 defines passageway section 13 therein. In a preferred embodiment, external surface 12*a* of internal body 11 has at least one contact point 15 with internal surface 11*b* of external body 11. Base section 16 includes edge 16*a* and side faces 16*b* and 16*c*. Base section 17 includes edge 17*a* and side faces 17*b* and 17*c*.

Contact point 15 should be construed as a blending, combination, or merging, of material of internal body 12 and external body 11, such that, internal body 12 and external body 11 are a singular component. The same can be said for sub-structure portions 20*a*-20*f*, and base sections 16 and 17, which cure from the printed material and form a singular structure. As such, the lines between the aforementioned components and layers, shown in FIGS. 1 through 3, are merely illustrative to distinguish individual portions of the present invention and should not be considered restrictive on the scope of the appending claims.

In some embodiments, before first outer layer 10 cures, mesh 21 is added to sub-structure portions 20*a*-20*f* such that mesh 21 covers passageway section 13 and stirrup 22 is added to the exposed surface of external body 11. Stirrup 22 is a reinforcement structure and may be comprised of a rebar—either metal, plastic, polymer, combinations thereof, or other like material. Stirrups 23 are also added to side faces 16*b* and 17*b* of bases 16 and 17, respectively.

Inner layers 30 are either printed on top of first outer layer 10 or on top of another respective inner layer. Inner layer 30 comprises essentially all of the same components of first outer layer 10, expect that inner layer 30 is thicker than first outer layer 10 (generally shown in FIGS. 3 and 4). As such, external body 11 and internal body 12 of sub-structure portions 20*a*-20*f* of internal layer 30 include apertures 24, which are arranged to be in fluid communication with passageway section 13 of the respective sub-structure portion. Passageway sections 13 of each sub-structure portions 20*a*-20*f* form passageway 52 of each of sub-structures 50*a*-50*f*. Spaces 14 of each sub-structure portions 20*a*-20*f* form spaces 53 of each of sub-structures 50*a*-50*f*. Each of apertures 24 includes external section 24*a* and internal section 24*b* arranged within external body 11 and internal body 12, respectively. External section 24*a* is in communication with the external environment and internal section 24*b*, while internal section 24*b* is in communication with passageway section 13*b* (of passageway 52) and external section 24*a*. In some embodiments, aperture 24 is located at each respective contact point 15 of each of sub-structure sections 20*a*-20*f* of inner layer 30. In some arrangements, each of sub-structure sections 20*a*-20*f* has a substantially hexagonal cross-section, where aperture 24 is arranged within each of the planar faces of the substantially hexagonal cross-section. External sections 24*a* of apertures 24 may be in communication with external section 24*a* of aperture 24 of an adjacently arranged external body 11, as generally shown in FIG. 5.

Each of sub-structure sections 20*a*-20*f* of inner layer 30 include mesh 21 and stirrup 22, and each of bases 16 and 17 of inner layer 30 include stirrup 23.

Once each of inner layers 30 has been printed and/or cured, second outer layer 40 is printed on top of inner layer 30 arranged farthest from first outer layer. Second outer layer 40 comprises essentially all of the components of first inner layer 10. In some embodiments, second outer layer 40 does not include mesh 21, stirrups 22, and stirrups 23.

Once all of layers 10, 30, and 40 have cured, mitigation structure 100 is assembled and ready to be reoriented. As shown in FIGS. 4 and 5, mitigation structure 100 is tipped such that it rests on distal end 10*a*. Mitigation structure 100, once fully printed, comprises cluster section 50 and bases 51*a* and 51*b*. Cluster section 50 comprises at least one of sub-structures 50*a*-50*f*. Each of the sub-structures include the sub-structure portion of first outer section 10, the sub-structure portion of at least one inner layer 30, and the sub-structure portion of second outer section 40 (e.g., sub-structure 50*a* comprises sub-structure portion 20*a* of first outer section, sub-structure portion 20*a* of at least one inner layer 30, and sub-structure portion 20*a* of second outer section 40). The bases (either 51*a* and/or 51*b*) each include the base section of the first outer section 10, the base section of at least one inner layer 30, and the base section of the second outer section 40. In some arrangements, cluster section 50 may comprise a plurality of sub-cluster sections, i.e., a first sub-cluster section comprising sub-structures 20*a*-20*c* and a second sub-cluster section comprising sub-structures 20*d*-20*f*, or a first sub-cluster section comprising sub-structures 20*a*-20*c* and base 51*a* and a second sub-cluster section comprising sub-structures 20*d*-20*f* and base 51*b*, etc. In a preferred embodiment, cluster section 50 comprises at least two sub-structures.

As shown in FIG. 4, each of sub-structures 50*a*-50*f* comprise passageway 52 (comprised of passageway sections 13 of outer layers 10 and 40 and at least one inner layer 30) within internal body 56 (comprised of internal bodies 12 of outer layers 10 and 40 and at least one inner layer 30), external body 55 (comprised of external bodies 11 of outer layers 10 and 40 and at least one inner layer 30), at least one space 53 (comprised of spaces 14 of outer layers 10 and 40 and at least one inner layer 30), and at least one contact point 54 (comprised of contact points 15 of outer layers 10 and 40 and at least one inner layer 30). External body 55 includes external surface 55*a* and internal surface 55*b*, and internal body includes external surface 56*a* and internal surface 56*b* which defines passageway 52 of the respective sub-structure. It should be noted that aperture 24 extends into external body 55 and internal body 56, such that aperture 24 is in communication with passageway 52.

In some embodiments, the present invention may comprise wave-force mitigation structure 100, mitigation structure 100 comprising: at least one cluster section 50 having at least one longitudinal passageway 52, longitudinal passageway 52 having at least one center point, the at least one center point defined by one of: an imaginary circumference; and, internal edge 12*b* of at least one longitudinal passageway 52, cluster section 50 having plurality of apertures 24 in fluid communication with at least one passageway 52, and at least one reinforcement structure 22 embedded within at least one cluster section 50 and arranged proximate internal edge 12*b* of at least one longitudinal passageway 52, wherein cluster section 50 is formed by the process of 3D printing. In some arrangements, cluster section 50 of wave-force mitigation structure 100 may further comprise external body 55 having internal surface 55*b* and external surface 55*a*, and at least one internal body 56 having internal surface 56*b* and external surface 56*a*, at least one internal body 56 arranged within external body 55 and further arranged to have at least one contact point 54 with internal surface 55*b* of external body 55, at least one internal body 56 including at least one longitudinal passageway 52 therein, wherein at least one space 53 is formed between internal surface 55*b* of external body 55 and external surface 56*a* of at least one internal body 56.

In some embodiments, sub-structure 50*a* (or all of sub-structures 50*a*-50*f*) may include longitudinal reinforcement 60 (shown in FIG. 6) arranged within each of space 53 of each respective sub-structure, such that longitudinal reinforcement 60 extends through at least each of inner layers 30 of the respective sub-structure. Longitudinal reinforcement 60 is rebar that can be comprised of a metal, polymer, metal and plastic combination, composite, or the like.

The following description should be taken in view of the previous described figures and FIGS. 7 and 8. FIGS. 7 and 8 illustrate a perspective view of an alternative embodiment of mitigation structure 100. FIG. 7 generally shows the alternative embodiment of mitigation structure 100 without the grout infills and FIG. 8 generally shows the alternative embodiment of mitigation structure 100 with grout infills. In some embodiments, mitigation structure may further comprise at least one of sea wall 101, redirect curve 102, and footer 103. Sea wall 101 is arranged to extend from end 10*d* of mitigation structure 100 and includes base 101*c*, wall 101*d*, top platform 101*b*, and space 101*a*. In some arrangements, sea wall 101 may also include redirect curve 102 which may extend from end 10*d* of mitigation structure 100 and connect to a lower surface of top platform 101*b*. In a preferred embodiment, one end of redirect curve 102 extends from external surface 55*a* of sub-structure 50*a*. Footer 103 is arranged to extend from wall 101*d* of sea wall 101. Footer 103 includes base 103*c*, wall 103*d* extending from base 103*c*, top surface 103*d*, thereby forming space 103*a*. Alternatively, footer 103 could be arranged to extend from end 10*d* of mitigation structure 100.

As generally illustrated in FIG. 8, each of spaces 53 of sub-structures 50*a*-50*f*, space 101*a*, and space 103*a*, are arranged to be filled with grout such that the present invention comprises a singular piece. The grout infill may be comprised of the same material as mitigation structure 100, sea wall 101, redirect curve 102, and footer 103. The material may be concrete; however, it should be noted that those in the art will understand that in any suitable material, now known or hereafter developed, may be used in forming any of the components of the present invention described herein.

The following description should be taken in view of the aforementioned figures and FIGS. 9A through 9D. FIGS. 9A through 9D illustrate a further embodiment of mitigation structure 100 shown in FIGS. 7 and 8. In some embodiments, mitigation structure 100 may also include at least one of bench 106 extending from platform 101*b* of sea wall 101, railing 107 extending from platform 101*b* of seawall 101, and groove 108 and protrusion 109 extending from opposite side faces of wall 101*d*. Groove 108 is arranged to accept protrusion 109 of an adjacent mitigation structure to limit movement when placed.

Figure 10B:
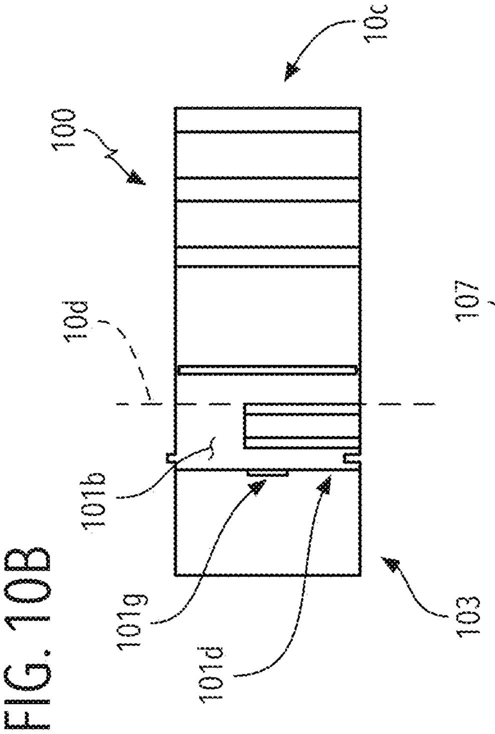
FIGS. 10A through 10C illustrate an oscillating water column ready embodiment of the invention shown in FIGS. 9A through 9D.
Figure 10C:
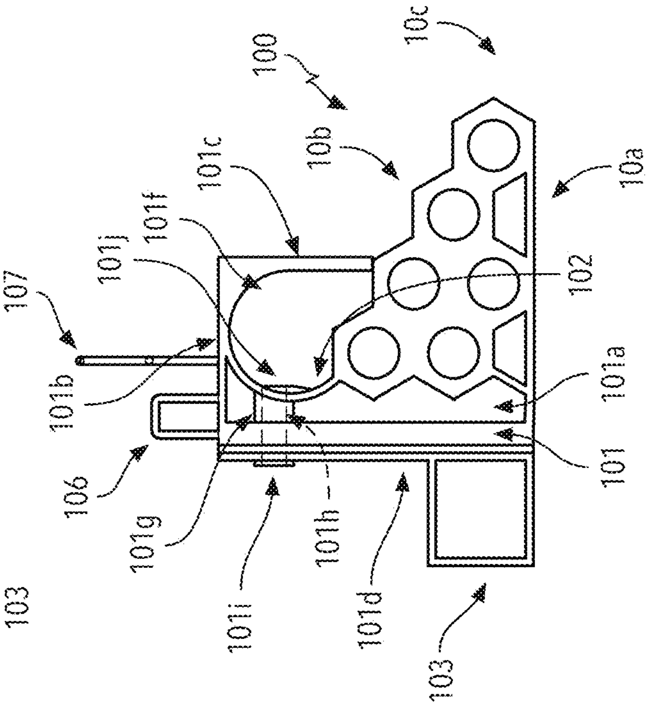
Figure 10A:
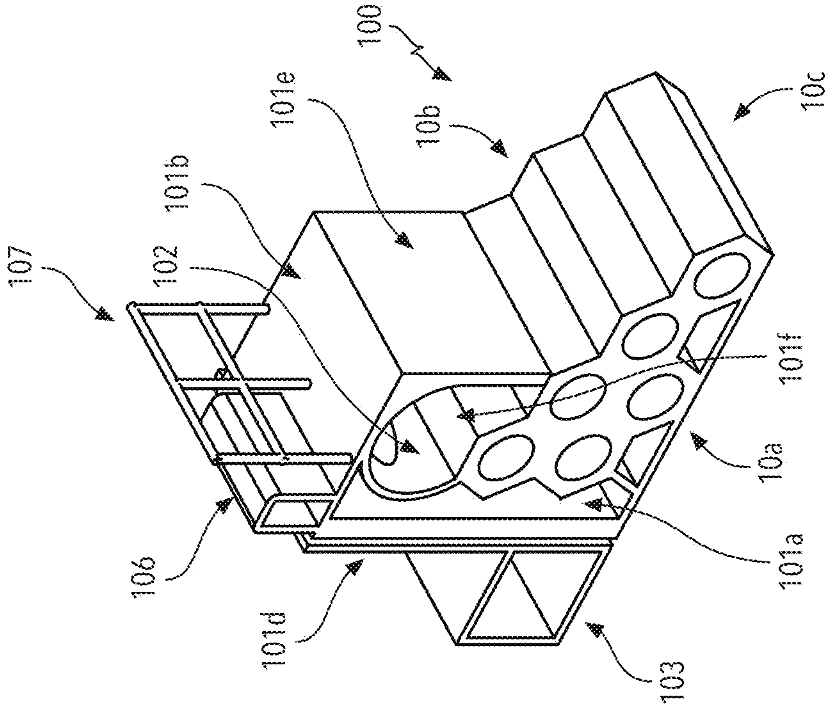

The following description should be taken in view of the aforementioned figures and FIG. 10A through 10C, which generally illustrate an even further embodiment of mitigation structure 100 shown FIGS. 9A through 9D and/or FIGS. 7 and 8. In one arrangement, mitigation structure comprises all of the components of structure 100 shown in FIGS. 7 and 8 and further includes front wall 101*e* connected to and positioned between platform 101*b* and proximal end 10*b* of mitigation structure 100, chamber 101*f*, and conduit 101*g* having passageway 101*h* therein. The embodiment shown in FIGS. 10A through 10C is formed to have an oscillating water column (hereinafter "OWC"), i.e., chamber 101*f* in combination with conduit 101*g* and an air turbine in communication with conduit 101*g*.

Generally, oscillating water columns (OWC) use an air turbine housed in a duct well (chamber 101*f* and conduit 101*g*) above the water surface. Chamber 101*f* of mitigation structure 100 shown in FIGS. 10A through 10C is at least partially open to a body of water such that incident waves force water inside chamber 101*f*, thereby oscillating in the vertical direction. As a result, the air above the surface of the water in chamber 101*f* moves in phase with the free surface of the water inside chamber 101*f* and drives the air turbine positioned within conduit 101*g*. In some embodiments of mitigation structure 100 shown in FIGS. 10A through 10C, conduit 101*g* has a cross-sectional area that is less than the cross-sectional area of chamber 101*g*, thereby enhancing the speed of airflow within conduit 101*g*. A key feature of the OWC-ready mitigation structure 100, is the design of conduit 101*g* and chamber 101*f*, which collectively allow the air turbine to be positioned at least partially within conduit 101*g*. In some arrangements may be a "Wells turbine", or other suitable turbines. A turbine that may be used within conduit 101*g* may include an axis, which a hub is rotatable secured thereon, and a plurality of turbine blades (preferable unidirectional) positioned and extending from the hub.

Additional illustrations and information regarding the turbine are detailed in the Appendix of U.S. Patent Application No. 63/505,901.

In operation, the turbine within conduit 101*g* is rotated in a first direction (about its axis) within conduit 101*g* when the water level rises within chamber 101*f* (due to the water creating air pressure within chamber 101*f* and thereby forcing the air past the blades) and when the water level recedes within chamber 101*f*, the turbine within conduit 101*g* is rotated in a second direction (due to the receding water creating opposite air pressure within chamber 101*f* and thereby forcing the air part of the blades in the opposite direction).

Figure 11A:
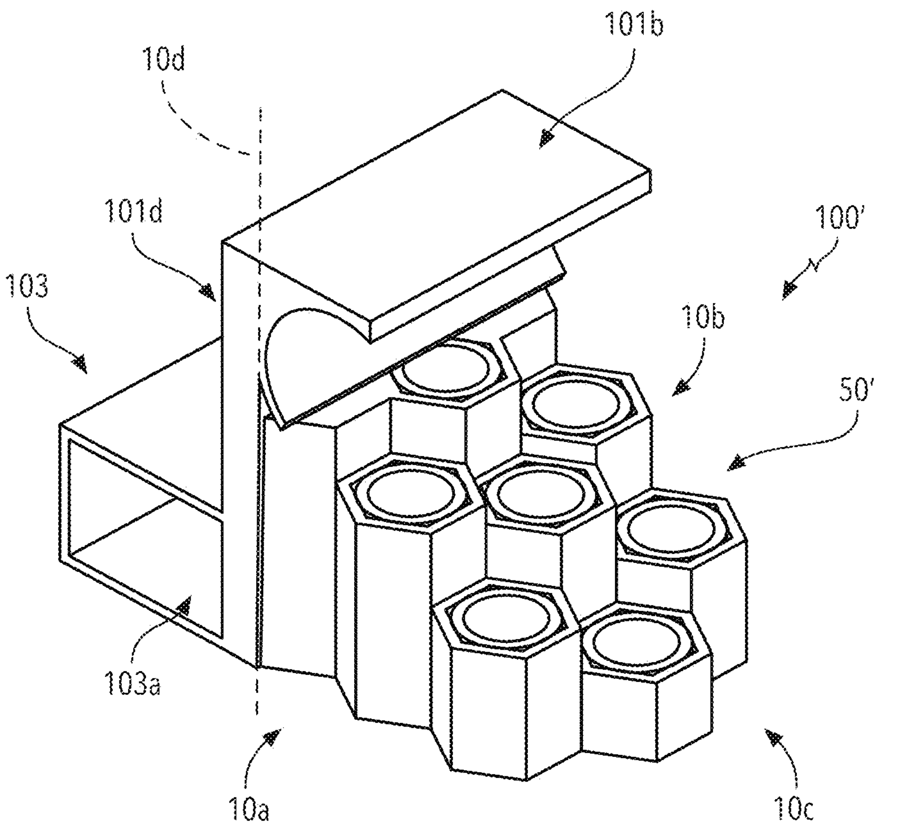
FIGS. 11A and 11B illustrate a further embodiment of the invention shown in FIGS. 7 and 8.
Figure 11B:
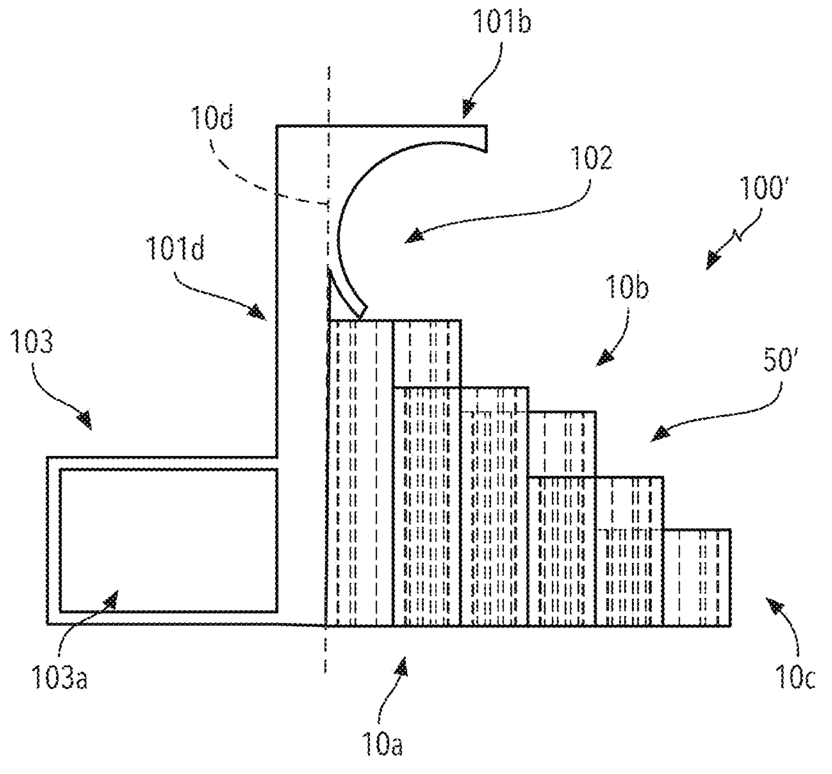

The following description should be taken in view of the aforementioned figures and FIGS. 11A and 11B, which generally illustrate a further embodiment of mitigation structure 100 shown in FIGS. 7 and 8, mitigation structure 100'. The difference between mitigation structure 100 and mitigation structure 100' is cluster section 50', which is substantially equivalent to cluster section 50 of mitigation structure 100 (such that in some arrangements it may also comprise, some, or all, of the same components) except that it has been reoriented approximately 90°-thereby eliminating the need to reorient the structure after the printing is completed, unlike mitigation structure 100.

Figure 12A:
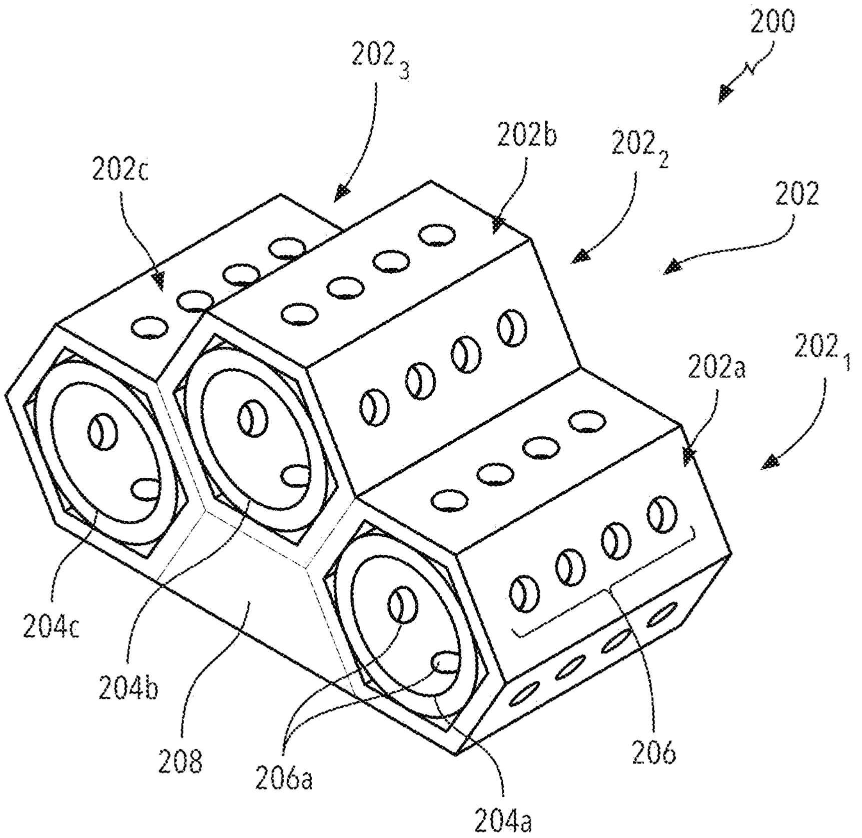
FIGS. 12A through 12F illustrate an off-shore embodiment of the present invention.
Figure 12B:
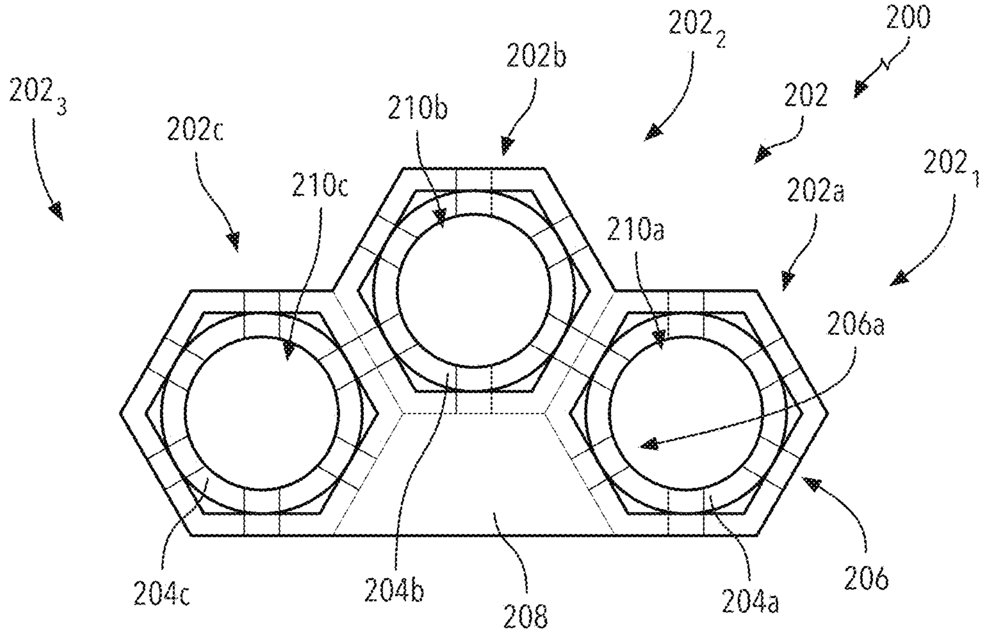
Figure 12C:
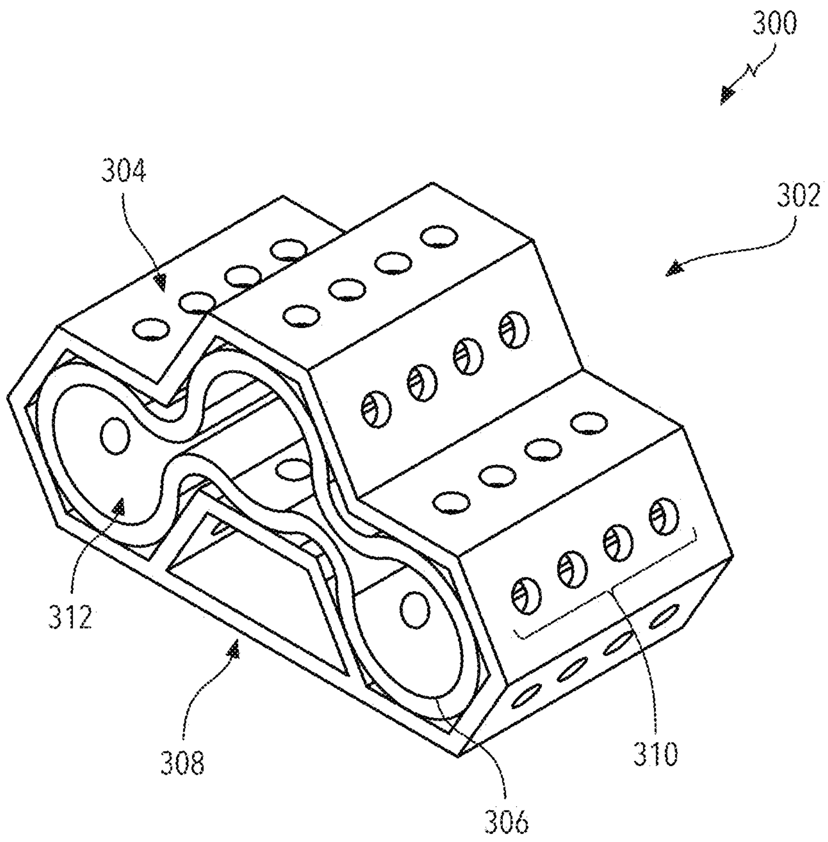
Figure 12D:
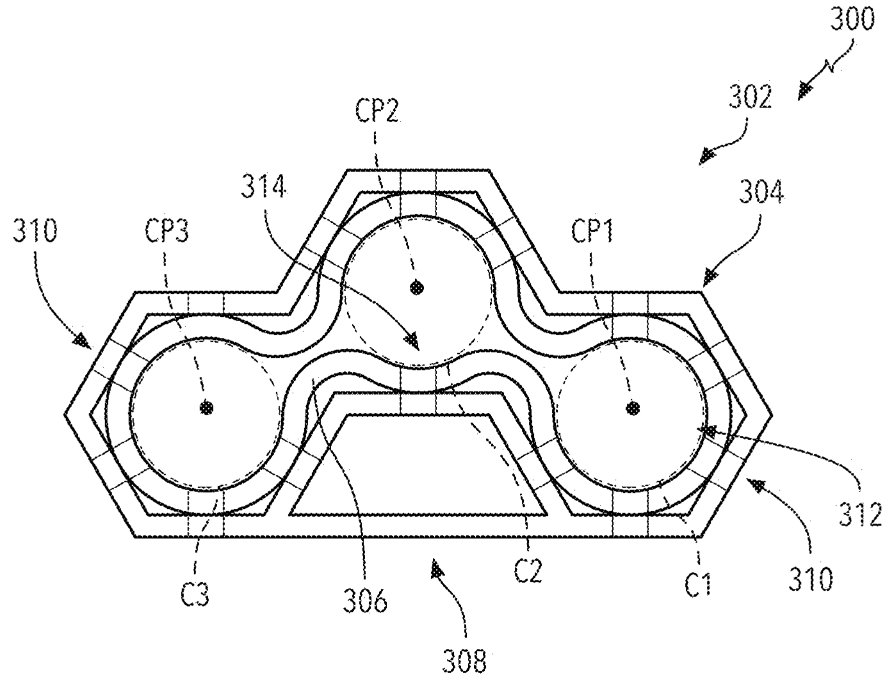
Figure 12E:
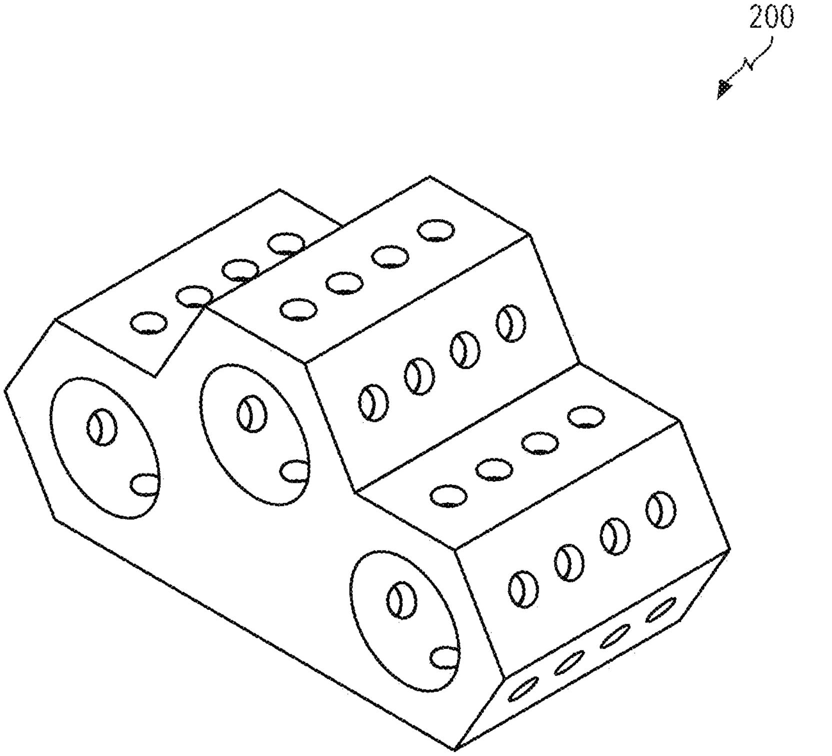
Figure 12F:
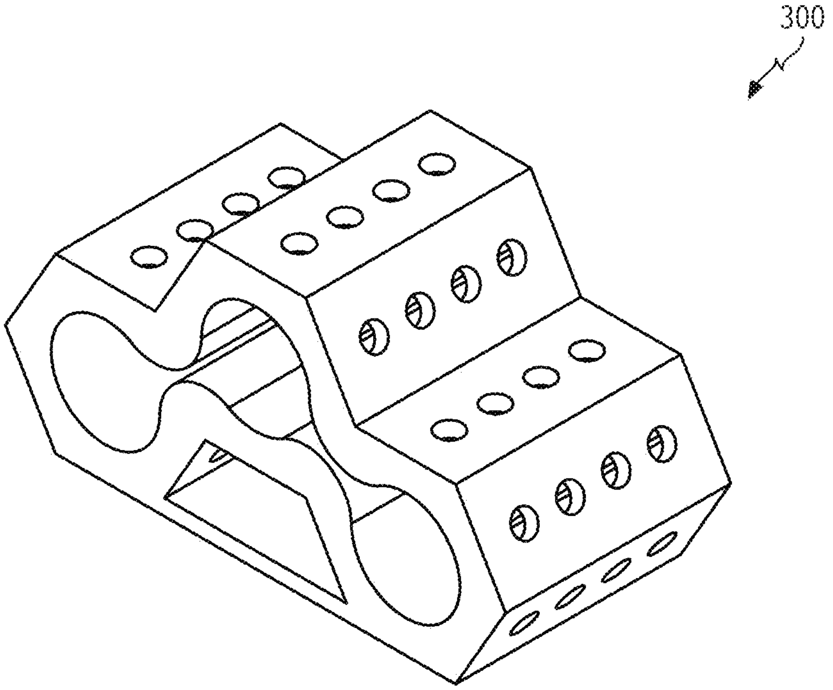

The following description should be taken in view of FIGS. 12A through 12E which generally illustrate a first embodiment of an offshore embodiment of the present invention, mitigation structure 200 (shown in FIGS. 12A and 12B, and filled with grout in FIG. 12E), and an alternative embodiment of mitigation structure 200, mitigation structure 300 (shown in FIGS. 12C and 12D, and filled with grout in FIG. 12F). Mitigation structure 200 may include all of, or some, of the components of mitigation structure 100, as described supra and shown in FIGS. 1 through 8. Similarly, mitigation structure 200 may be configured substantially identical to mitigation structure 100, i.e., spaces between inner and outer bodies, etc. As such, mitigation structure 200 includes cluster section 202 which is comprised of sub-structures $\mathbf{202}_1$, $\mathbf{202}_2$, and $\mathbf{202}_3$. Sub-structure $\mathbf{202}_1$ includes outer body 202*a* and inner body 204*a* having passageway 210*a* therein. Sub-structure $\mathbf{202}_2$ includes outer body 202*b* and inner body 204*b* having passageway 210*b* therein. Sub-structure $\mathbf{202}_3$ includes outer body 202*c* and inner body 204*c* having passageway 210*c* therein. Mitigation structure 200 also includes base 208, which is substantially sandwiched between sub-structures $\mathbf{202}_1$, $\mathbf{202}_2$, and $\mathbf{202}_3$. In a preferred embodiment, sub-structures $\mathbf{202}_1$, $\mathbf{202}_2$, and $\mathbf{202}_3$, along with base 208, are a joined body, i.e., connected, similar to cluster section 50. It should be noted that cluster section 202 may be comprised of any number of sub-structures and bases. Each of outer bodies 202*a*, 202*b*, and 202*c* and base 208 include plurality of apertures 206. Each of inner bodies 204*a*, 204*b*, and 204*c* include plurality of apertures 206*a*, where each aperture of plurality of apertures 206*a* is in communication with a respective aperture of plurality of apertures 206, where further each aperture of plurality of apertures 206*a* is in communication with at least one of passageways 210*a*, 210*b*, and/or 210*c*.

Mitigation structure 200 is ideally arranged to be placed off-shore and its arrangement forces water, moved by tidal current, waves, etc., to be passed through at least one of: 1. At least one of passageways 210*a*, 210*b*, and/or 210*c;* 2. Plurality of apertures 206; 3. Plurality of apertures 206*a*; and/or, a combination thereof, thereby decreasing and/or dissipating the force associated with various water movements.

Mitigation structure 300 generally comprises cluster section 302 and at least one of base 308. In some arrangements, cluster section 302 comprises external body 304 having plurality of apertures 310 therein and internal body 306 positioned within external body 304, where internal body 306 includes plurality of apertures 314 therein. Passageway 312 is arranged within internal body 306 and is bounded by an internal edge of internal body 306. In some embodiments, passageway 312 comprises at least one center point defined by an imaginary circumference defined by the internal edge of internal body 306. In other embodiments, passageway 312 comprises center points CP1, CP2, and CP3 which are defined by imaginary circumferences C1, C2 and C3, respectively. Imaginary circumferences C1, C2 and C3 are defined by the internal edge of internal body 306. In a preferred arrangement, plurality of apertures 310 are in communication with plurality of apertures 314, whereas plurality of apertures 314 are in communication with passageway 312. In other arrangements, base 308 may comprise a plurality of apertures therein, which apertures may be in communication with some of plurality of apertures 314. The apertures, e.g., 310 and/or 314, are not intended to be restrictive to any specific shape and thus, may be formed in a variety of different geometries, e.g., substantially square, triangular, irregular polygonal, tapered or non-taper, a combination thereof, and/or the like.

Mitigation structure 300 is arranged in a manner where a printer device, which prints the structure, does not need to execute multiple "lifts". Lifts occur when the printer device cannot continually print, therefore needing to shut off and reposition a nozzle to begin printing again. As shown in FIGS. 12C and 12D, at least one of external body 304 and base 308 is a continuous component, therefore the printing machine does not need to lift in order to complete the printing. Similarly, internal body 306 is also a continuous component. Therefore, in 3D printing mitigation structure 300, the printing device may only need to execute one lift, thereby reducing the print time of the structure.

Embodiments of FIGS. 12C and 12D (and 12F) may include longitudinal openings 333 disposed between adjacent longitudinal passageways 312, putting them in fluid communication with each other, the longitudinal passageways 312 which may be reinforced by solid portions 334 within the longitudinal openings and physically connecting adjacent longitudinal passageways 312. It should be noted that "solid portions" is referring to an additional reinforcement structure, such as at least one rebar-like member or the like, which still affords fluid communication between adjacent longitudinal passageways, and such additional reinforcement structure may comprise any combination of known reinforcement techniques or devices which maintains the aforementioned design goal. These embodiments, e.g., those shown in FIGS. 12C and 12D, are designed so that longitudinal pathways 312 can be 3D printed wherein printing can be contiguous without needing to lift associated print heads.

It should be noted that the structure arrangement of mitigation structure 300 may be applied to mitigation devices 100 and/or 200, i.e., singular component external body and singular component internal body.

Figure 13A:
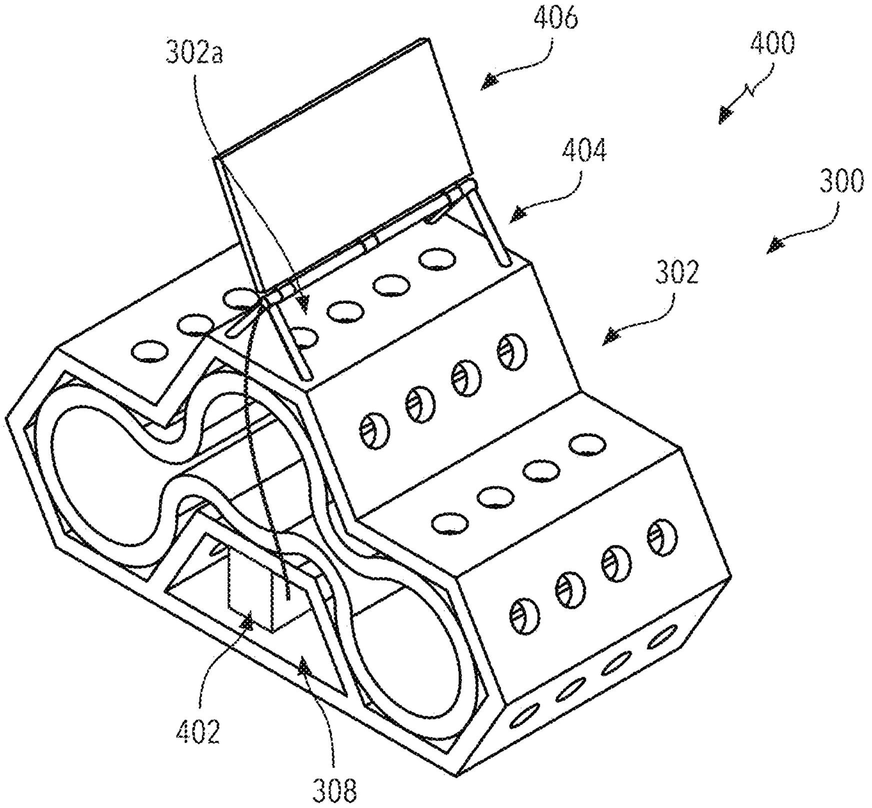
FIGS. 13A and 13B illustrate an alternative embodiment of the invention shown in FIGS. 12C and 12D; and, FIGS. 14 through 17 illustrate perspective views of further alternative configurations of the present invention.
Figure 13B:
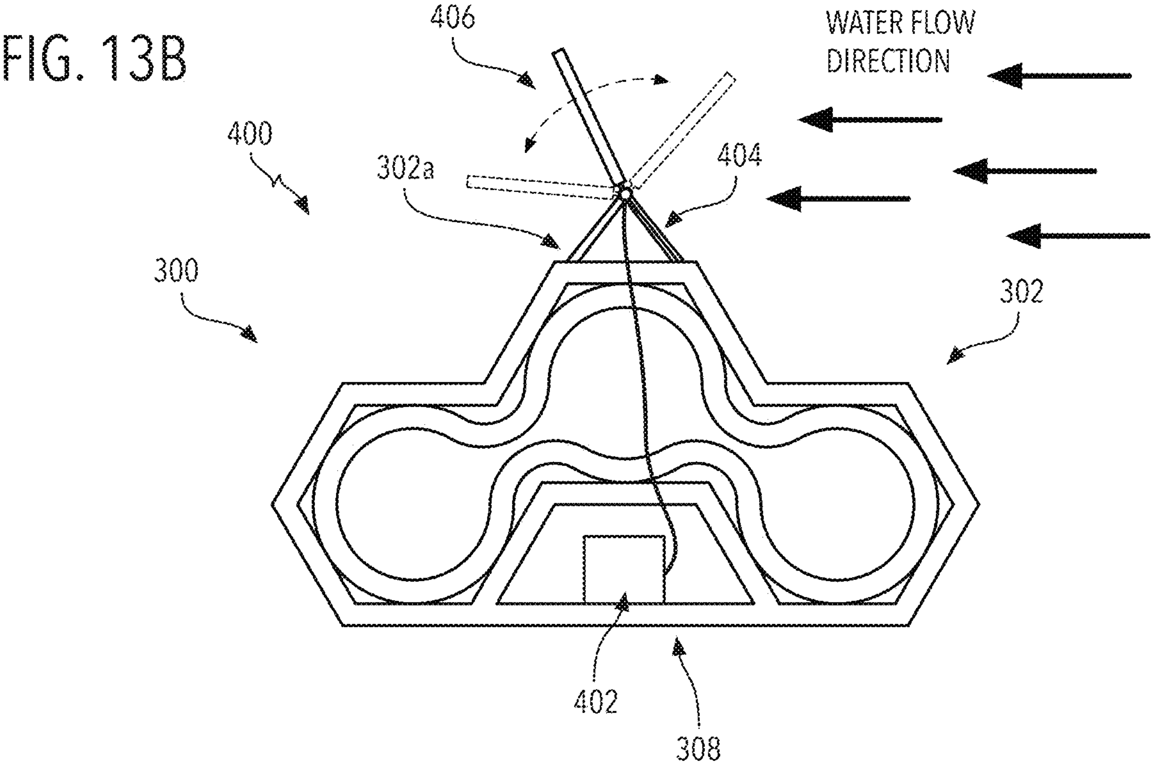
Figure 14:
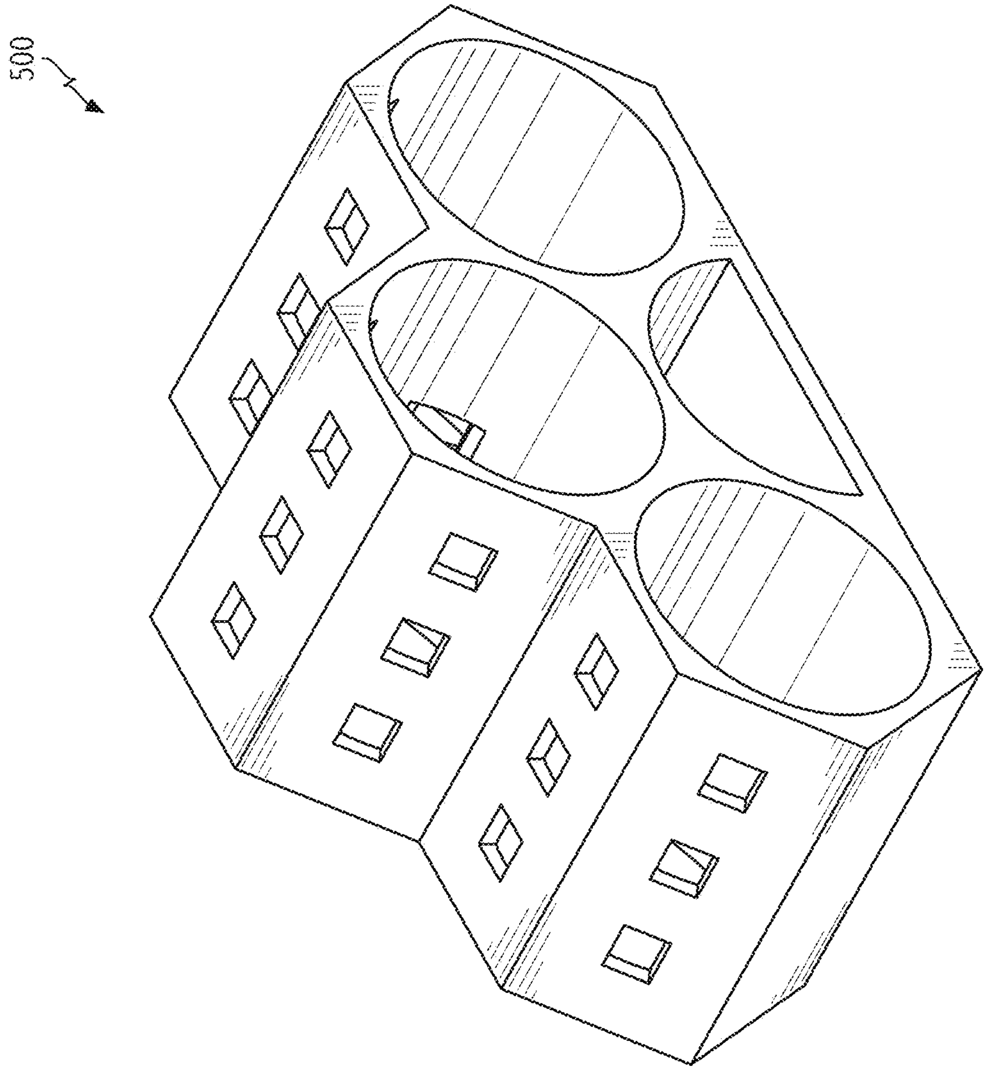
Figure 15:
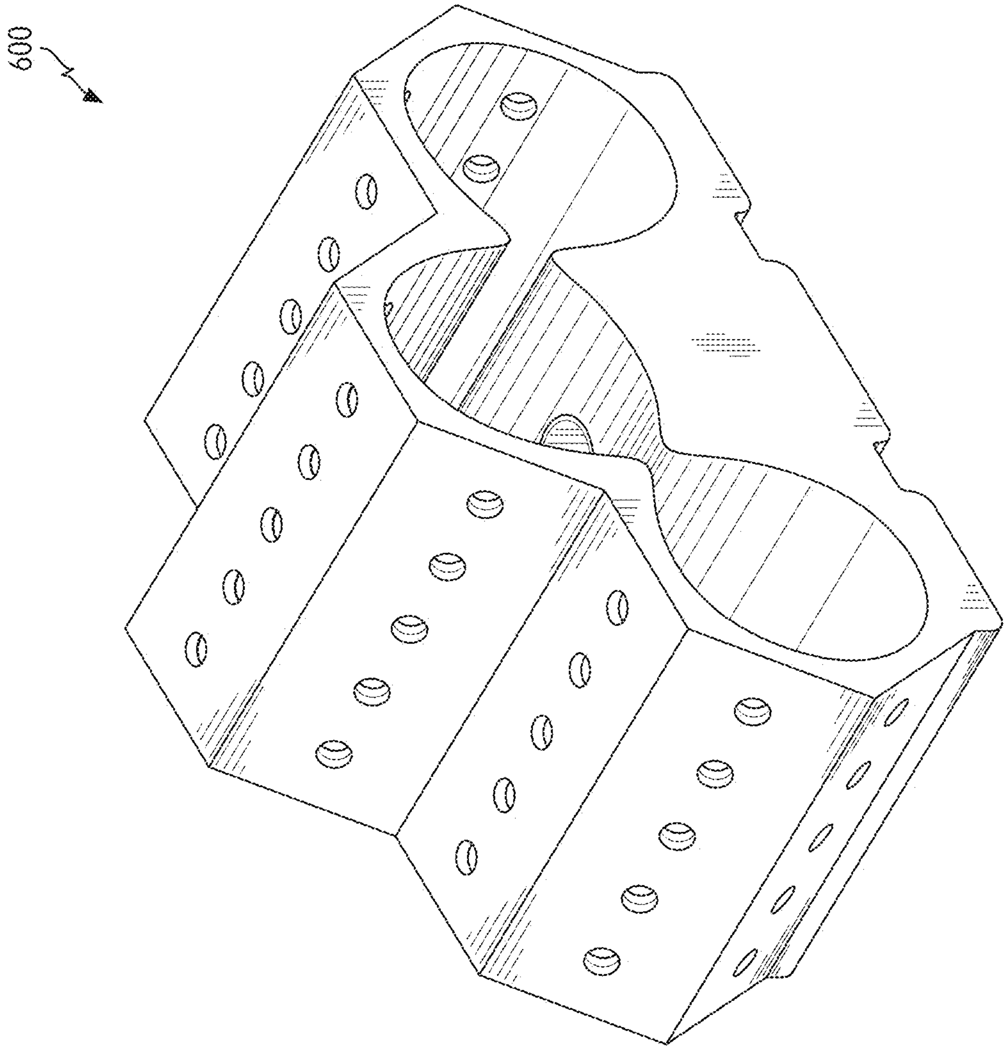
Figure 16:
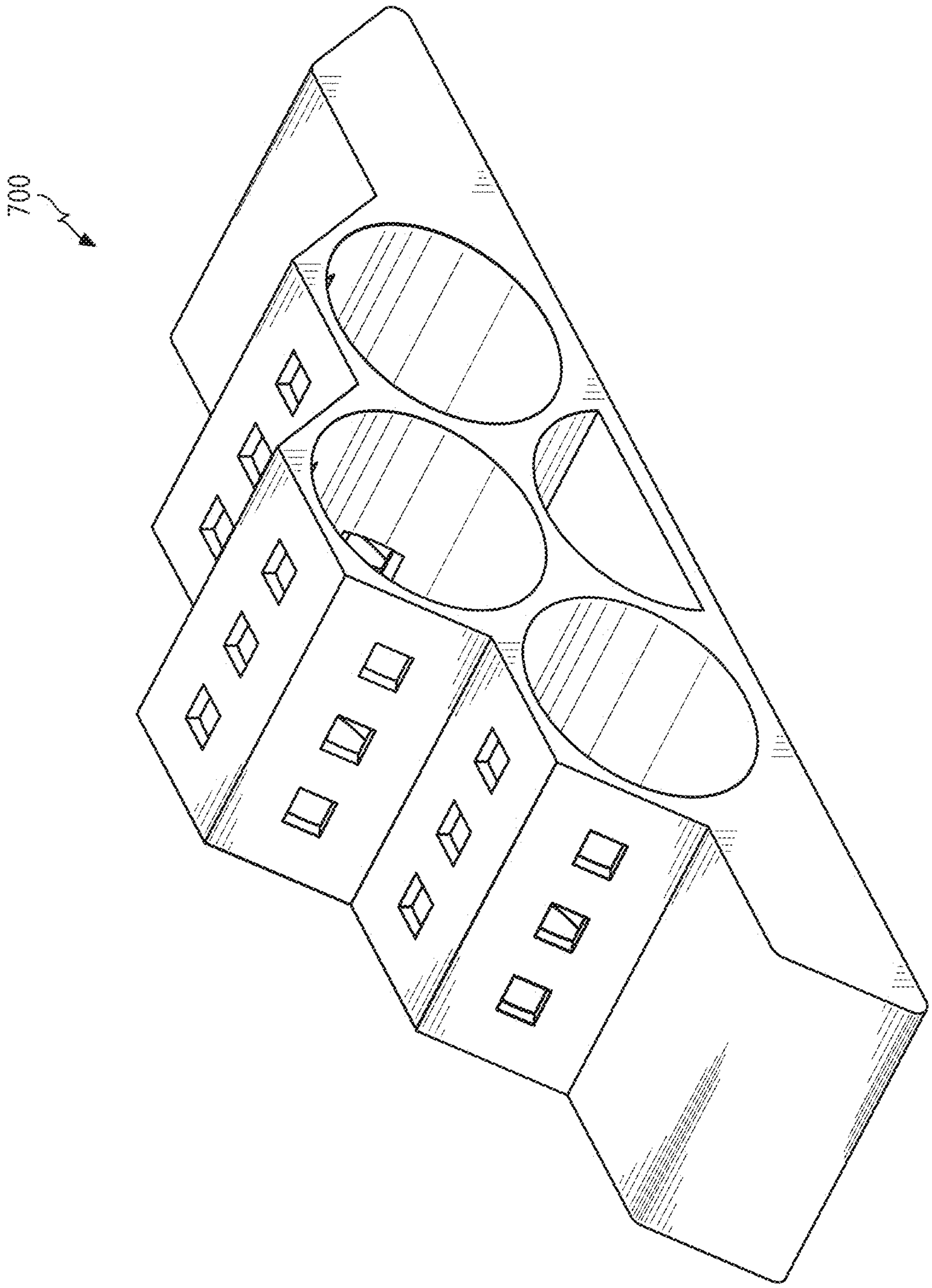
Figure 17:
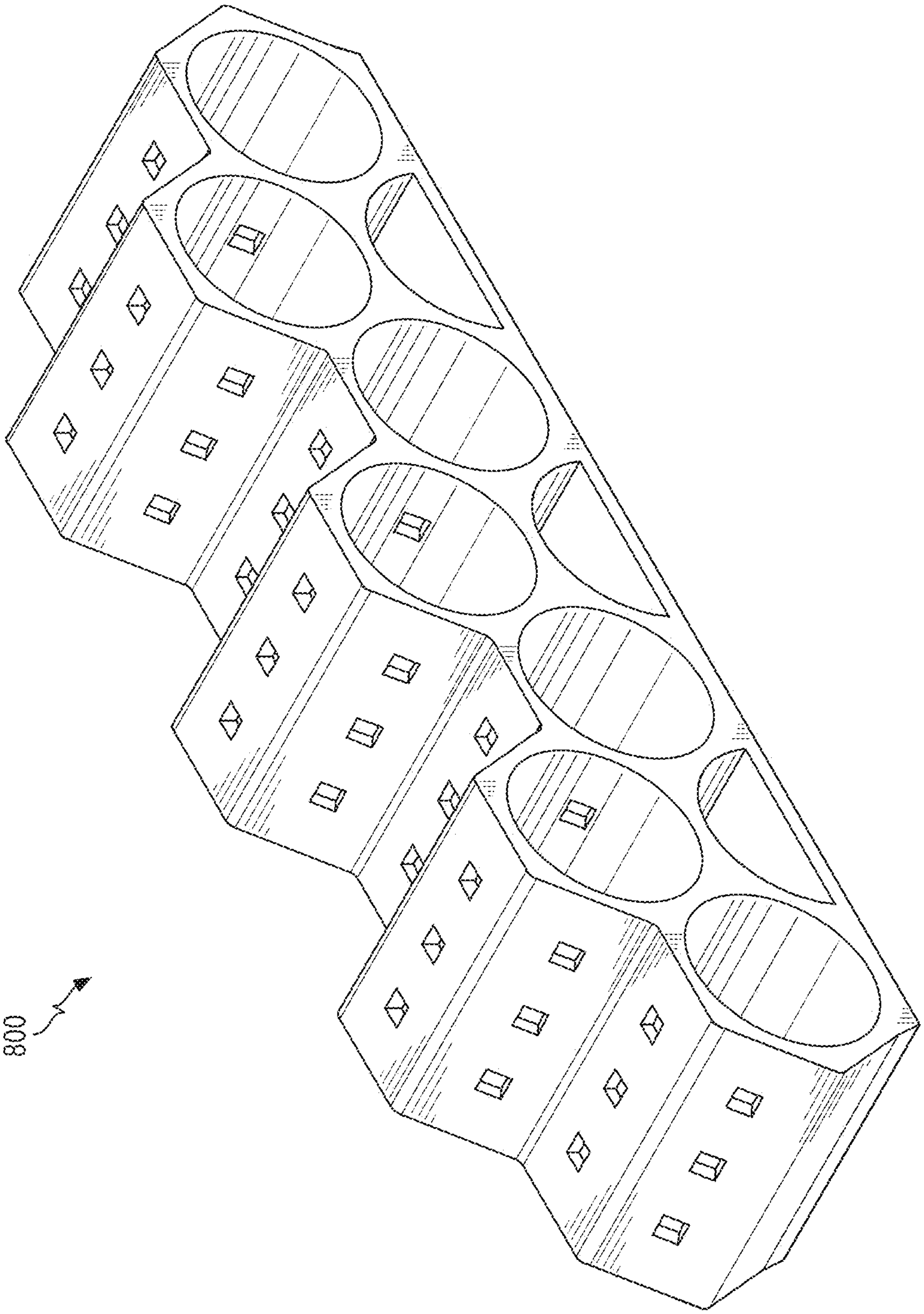

The following description should be taken in view of FIGS. 13A and 13B which generally illustrate an alternative embodiment of mitigation structure 300 (shown in FIGS. 12C and 12D), mitigation structure 400. Mitigation structure 400 includes mitigation structure 300 and further includes top surface 302*a* of mitigation structure 300, oscillating generator 402, support structure 404, and flap 406. Support structure 404 is fixed secured to top surface 302*a* and is arranged to pivotably connect flap 406 thereon. Flap 406 is pushed back and forth by water flow direction or by a flowing current to create a hydraulic pump. This pump, within generator 402 transfers its energy to a motor, also within generator 402, which then turns generator 402 and creates electricity. Oscillating generator 402, support structure 404, and flap 406, essentially function like a linear alternator. Linear alternators convert back-and-forth motion (i.e., of flap 406 from the water flow direction) directly into electrical energy.

In reference to FIGS. 14 through 17, each of these perspective views illustrate alternative configurations of a mitigation structure, specifically a wave mitigation structure, e.g., mitigations structures 500, 600, 700, and 800, as shown in FIGS. 14, 15, 16 and 17, respectively.

The inventive concept mitigates wave energy that may be described in terms of wave vectors or wavevectors used to describe a wave, with a typical wave vector unit being cycle per a distance such as a meter in which further there is a magnitude and direction. The magnitude is typically the wavenumber of the wave (inversely proportional to the wavelength), and its direction is perpendicular to the wavefront. In isotropic media, this is also the direction of wave propagation. A closely related vector is the angular wave vector (or angular wavevector), with a typical unit being radian per meter. The wave vector and angular wave vector are related by a fixed constant of proportionality, 2× radians per cycle and wave mitigation may involve angular wavevectors, radial wave vectors, and linear wave vectors or by what other terms may be used to describe wave vectors.

The wave-force mitigation structure as described can have at least one perforated cylindrical cluster section adapted to be parallelly abutted to at least one additional perforated cylindrical cluster section by substantially planner outer surface portions of the perforated cylindrical cluster sections wherein at least one or more of water and air may pass through and between the at least one perforated cylindrical cluster sections. Such abutment allows the elimination of excess space and geometric arrangements such as assuring perforation is lined up or are deliberately misaligned so as to affect dissipation of wave energy. Inner surface portions and the substantially planner outer surface portions of the perforated cylindrical cluster sections are adapted to at least partially dissipate wave energy from at least one primary wave vector into a plurality of smaller wave vectors, typically by such ways as reflecting waves, restricting wave passage, changing wave magnitude, changing wave frequency, creating turbulence, absorbing energy, and other ways by which wave energy can be dissipated when compared to arriving wave vectors. The at least one perforated cylindrical cluster section is formed and formable from a plurality of 3D printed, substantially planar layers disposed orthogonal to a longitudinal center axis of each perforated cylindrical cluster section wherein each layer can be assigned a unique plane parallel to the plans of preceding or following printed layers.

The wave-force mitigation structure cylindrical cluster section may further include at least one perforated inner cylinder disposed within a perforated polygonal outer cylinder. The perforated polygonal outer cylinder may further be hexagonal such that the at least on cylindrical cluster sections may be assembled in parallel rows to, cross-sectionally, appear as a honeycomb-like structure.

It should be noted that the perforations and/or apertures may be formed post-printing by any means capable of boring, drilling, cutting, or otherwise creating the plurality of perforations and/or apertures within the wave-force mitigation structure.

Alternatively, lintel-like means may be placed during the printing process of the wave-force mitigation structure at the respective locations of each of the plurality of perforations and/or apertures. Generally, a lintel is a beam, support structure, filling, matrix unit, which placed across openings in buildings like doors, windows, etc., to support the load from the structure above, i.e., to support the load of the extruded material from a 3D printing system or 3D printer—as shown in the Appendix of U.S. Patent Application No. 63/505,901. These lintels may be permanent structures, or temporary structures which are removed after the printing process is completed and material has cured.

However, the present inventive concept may use an inflatable lintel-like structure, which is generally inflated during the printing process to fill a location in the structure to be printed, thereby creating, voids, apertures, through-bore, spaces, gaps, etc., which extruded material from the printing system or printer may then print over. The inflatable structure is then deflated and removed from the completed and cure structure, leaving the desired voids, apertures, through-bore, spaces, gaps, etc., within the structure. In one embodiment, the inflatable lintel structure generally will include a main body and at least one sub-body extending therefrom. The main body and the sub-body have at least one internal cavity which is arranged to be inflated via a gas, i.e., air, oxygen, etc. The inflatable structure will be arranged such that it may support extremely high PSI within the internal cavity to maintain the shape of at least: the main body; and at least one sub-body, such that the weight of printed material thereon, will not collapse, or otherwise deform, the shape and configuration of the main body and at least one sub-body (if any). See Appendix, U.S. Patent Application No. 63/505,901.

Lastly, one having ordinary skill in the art would appreciate that although the present invention is best implemented by means of additive manufacturing, e.g., 3D printing, and particular embodiments are optimized for such manufacturing means, as discussed supra, methods of constructing the present invention are not limited to 3D printing and may be implemented by other known techniques, e.g., dry-casting, wet-casting, and other building techniques now known or hereafter developed. The is same true with respect to materials selected to form the present invention, and those in the art will understand that any suitable material, now known or hereafter developed, may be used in forming the present invention described herein.

The shown and described embodiments are merely exemplary and various alternatives, combinations, omissions, of specific components, or foreseeable alternative components, understood by one having ordinary skill in the art, described in the present disclosure or within the field of the present disclosure, are intended to fall within the scope of the appending claims.

It will be also be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

The following is a comprehensive list of the reference numerals and their corresponding elements as described and shown in the drawings, in a non-limiting manner: 10 First Outer Layer; 10*a* Distal End; 10*b* Proximal End; 10*c* Front End; 10*d* Back End; 11 External Body; 11*a* External Surface of Body 11; 11*b* Internal Surface of Body 11; 12 Internal Body; 12*a* External Surface of Body 12; 12*b* Internal Surface of Body 12; 13 Passageway Section; 14 Space; 15 Contact Point; 16 Base Section; 16*a* Edge; 16*b* Side Face; 16*c* Side Face; 17 Base Section; 17*a* Edge; 17*b* Side Face; 17*c* Side Face; 20 Cluster Layer; 20*a*-20*f* Sub-structure Portions; 21 Mesh; 22 Stirrup; 23 Stirrup; 24 Apertures; 24*a* External Section of Aperture 24; 24*b* Internal Section of Aperture 24; 30 Inner Layer; 40 Second Outer Layer; 50 Cluster Section; 50' Cluster Section; 50*a*-50*f* Sub-structures; 51*a* Base; 51*b* Base; 52 Passageway; 53 Space; 54 Contact Point; 55 External Body; 55*a* External Surface of Body 55; 55*b* Internal Surface of Body 55; 56 Internal Body; 56*a* External Surface of Body 56; 56*b* Internal Surface of Body 56; 60 Longitudinal Reinforcement; 100 Mitigation Structure; 100' Mitigation Structure; 101 Sea Wall; 101*a* Space; 101*b* Top Platform; 101*c* Base of Sea Wall; 101*d* Wall of Sea Wall; 101*e* Front Wall; 101*f* Chamber; 101*g* Conduit; 101*h* Passageway; 102 Redirect Curve; 103 Footer; 103*a* Space; 103*c* Base of Footer; 103*d* Top Surface of Footer; 106

Bench; 107 Railing; 108 Groove; 109 Protrusion; 200 Mitigation Structure; 202 Cluster Section; $202_1$ Sub-structure; $202_2$ Sub-structure; $202_3$ Sub-structure; **202*a* Outer Body; 202*b* Outer Body; 202*c* Outer Body; 204*a* Inner Body; 204*b* Inner Body; 204*c* Inner Body; 206 Plurality of Apertures; 206*a* Plurality of Apertures; 208 Base; 210*a* Passageway; 210*b* Passageway; 210*c* Passageway; 300 Mitigation Structure; 302 Cluster Section; 302*a* Top Surface; 304 External Body; 306 Internal Body; 308 Base; 310 Plurality of Apertures; 312 Passageway; 314 Plurality of Apertures; 333 Longitudinal Openings; 334 Solid Portions; 400 Mitigation Structure; 402 Oscillating Generator; 404 Support Structure; 406 Flap; 500 Mitigation Structure; 600 Mitigation Structure; 700 Mitigation Structure; 800 Mitigation Structure; C1 Imaginary Circumference; C2 Imaginary Circumference; C3 Imaginary Circumference; CP1 Center Point; CP2 Center Point; and, CP3** Center Point.

What is claimed is:

1. A wave-force mitigation structure, comprising:
- a unitary cluster section having a plurality of longitudinal passageways, wherein:
  - the unitary cluster section is a single, monolithic body having a contiguous external surface;
  - material portions between adjacent longitudinal passageways are integrally formed with the external surface;
- each longitudinal passageway having at least one center axis, the at least one center axis defined by one of:
  - a longitudinal passageway circumference; and,
  - an internal surface of at least one longitudinal passageway of the plurality of longitudinal passageways; and,
- each longitudinal passageway in fluid communication with at least one adjacent longitudinal passageway.

2. The wave-force mitigation structure recited in claim 1, wherein the unitary cluster section comprises:
- an external body having an internal surface and external surface; and,
- at least one internal body having an internal surface and external surface, the at least one internal body arranged within the external body and further arranged to have at least one contact point with the internal surface of the external body, the at least one internal body including at least one longitudinal passageway of the plurality of longitudinal passageways therein, wherein at least one space is formed between the internal surface of the external body and the external surface of the at least one internal body.

3. The wave-force mitigation structure recited in claim 2 further comprising at least one grout section arranged within the at least one space.

4. The wave-force mitigation structure recited in claim 2 further comprising at least one longitudinal reinforcement structure arranged within the at least one space.

5. The wave-force mitigation structure recited in claim 4 further comprising at least one grout section arranged within the at least one space.

6. The wave-force mitigation structure recited in claim 1 further comprising a footer section extending from the unitary cluster section.

7. The wave-force mitigation structure recited in claim 6 further comprising a wave-redirect section extending from the unitary cluster section.

8. The wave-force mitigation structure recited in claim 6 further comprising:
- a footer section extending from the unitary cluster section; and,
- a wave-redirect section extending from the unitary cluster section.

9. The wave-force mitigation structure recited in claim 1, further comprising:
- at least one reinforcement structure disposed substantially perpendicular to the at least one center axis and embedded within the unitary cluster section.

10. The wave-force mitigation structure recited in claim 9, wherein the unitary cluster section is formed by the process of 3D printing.

11. A wave-force mitigation structure, comprising:
- at least one cylindrical cluster section adapted to be parallelly abutted to at least one additional cylindrical cluster section by substantially planar outer surface portions of the cylindrical cluster sections wherein at least one or more of water and air may pass through and between the at least one cylindrical cluster sections;
- inner surface portions and the substantially planner outer surface portions of the cylindrical cluster sections adapted to at least partially dissipate wave energy from at least one primary wave vector into a plurality of smaller wave vectors; and
- wherein: at least one longitudinal opening of the at least one passageway is in fluid communication with at least one adjacent longitudinal passageway; and, wherein the at least one cylindrical cluster section further comprises at least one inner cylinder disposed within a polygonal outer cylinder.

12. The wave-force mitigation structure of claim 11, wherein the polygonal outer cylinder is hexagonal.

13. The wave-force mitigation structure of claim 11, wherein the at least one cylindrical cluster is perforated.

14. The wave-force mitigation structure recited in claim 11, wherein the at least one cluster section is adapted to be formed by the process of 3D printing.

* * * * *